United States Patent
Green et al.

(10) Patent No.: US 10,197,212 B2
(45) Date of Patent: *Feb. 5, 2019

(54) SMART SUBSEA PIPELINE

(71) Applicant: HALLIBURTON ENERGY SERVICES, INC., Houston, TX (US)

(72) Inventors: Todd J. Green, Spring, TX (US); Alexis Wachtel, Houston, TX (US); William Markus, Magnolia, TX (US); John L. Maida, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 85 days.

This patent is subject to a terminal disclaimer.

(21) Appl. No.: 15/043,677

(22) Filed: Feb. 15, 2016

(65) Prior Publication Data

US 2016/0161042 A1    Jun. 9, 2016

Related U.S. Application Data

(63) Continuation of application No. PCT/US2014/067423, filed on Nov. 25, 2014.

(51) Int. Cl.
*F16L 55/00* (2006.01)
*F16L 57/06* (2006.01)
(Continued)

(52) U.S. Cl.
CPC ........ *F16L 59/143* (2013.01); *E21B 17/1035* (2013.01); *E21B 17/206* (2013.01);
(Continued)

(58) Field of Classification Search
CPC ..... F16L 1/15; F16L 1/16; F16L 1/161; F16L 1/20; F16L 1/26; F16L 9/22; F16L 25/01;
(Continued)

(56) References Cited

U.S. PATENT DOCUMENTS 240,236 A   4/1881 Delany
2,761,137 A   8/1956 Fairbarn et al.
(Continued)

FOREIGN PATENT DOCUMENTS

CN   103016851   4/2013
EP   259373   4/1991
(Continued)

OTHER PUBLICATIONS

Knudsen, Continuous Condition Monitoring of Pipelines and Risers, retrieved from the internet at www.sintef.no/Projectweb/SmarPipe/ at least as early as Sep. 19, 2014, 21 pages.
(Continued)

*Primary Examiner* — Frederick L Lagman
*Assistant Examiner* — Stacy N Lawson
(74) *Attorney, Agent, or Firm* — Kilpatrick Townsend & Stockton LLP

(57) ABSTRACT

Pipeline segments can contain cables, such as communication cables (e.g., fiber optic cables) within insulation material surrounding the pipeline segments. Cables can be embedded within the insulation material, run through conduits embedded within the insulation material, placed in channels formed in the insulation material, or otherwise. Channels containing one or more cables can be filled with supplemental insulation material, thus securing the cables within the channels. Pipelines created as disclosed herein can enable data transfer between distant points without the need to lay fiber optic cable in addition to the pipeline. Further, fiber optic cable embedded thusly can be used to sense conditions in the pipeline, such as leaks, seismic activity, strain, and temperature information.

13 Claims, 26 Drawing Sheets

(51) Int. Cl.

| | |
|---|---|
| *F16L 59/14* | (2006.01) |
| *E21B 47/12* | (2012.01) |
| *E21B 17/10* | (2006.01) |
| *E21B 17/20* | (2006.01) |
| *G02B 6/44* | (2006.01) |
| *G02B 6/50* | (2006.01) |
| *G01M 3/16* | (2006.01) |
| *G01M 3/18* | (2006.01) |
| *G01M 5/00* | (2006.01) |
| *G01M 11/08* | (2006.01) |
| *F16L 25/01* | (2006.01) |

(52) U.S. Cl.
CPC ............. *E21B 47/12* (2013.01); *G01M 3/165* (2013.01); *G01M 3/18* (2013.01); *G01M 5/0025* (2013.01); *G01M 5/0041* (2013.01); *G01M 5/0091* (2013.01); *G01M 11/086* (2013.01); *G02B 6/4459* (2013.01); *G02B 6/4463* (2013.01); *G02B 6/502* (2013.01); *F16L 25/01* (2013.01); *F16L 2201/30* (2013.01)

(58) Field of Classification Search
CPC ....... F16L 53/007; F16L 59/14; F16L 59/143; F17D 1/02; H01P 3/00; H01P 3/12; H01P 3/121; H01P 3/122; H01P 3/127; G02B 6/4463; G02B 6/50; G02B 6/502; G02B 6/506
USPC ................................ 405/170, 184.5; 138/149
See application file for complete search history.

(56) References Cited

U.S. PATENT DOCUMENTS

| | | | | |
|---|---|---|---|---|
| 4,288,653 | A | * | 9/1981 | Blom .................... F16L 59/143 137/551 |
| 4,384,905 | A | * | 5/1983 | Gros .................. B29C 44/1242 156/294 |
| 4,429,213 | A | | 1/1984 | Julien |
| 4,822,653 | A | | 4/1989 | Kauffman et al. |
| 5,212,349 | A | | 5/1993 | Pelzer |
| 5,241,147 | A | * | 8/1993 | Ahlen .................... F16L 53/004 219/629 |
| 5,415,242 | A | | 5/1995 | Pelzer |
| 5,532,598 | A | | 7/1996 | Clark, Jr. et al. |
| 5,551,484 | A | | 9/1996 | Charboneau |
| 5,921,285 | A | * | 7/1999 | Quigley .................... D04C 1/06 138/114 |
| 5,922,995 | A | | 7/1999 | Allen |
| 5,979,506 | A | | 11/1999 | Aarseth |
| 5,995,696 | A | | 11/1999 | Miyagi et al. |
| 6,004,639 | A | * | 12/1999 | Quigley ................ B29C 70/086 138/125 |
| 6,058,979 | A | | 5/2000 | Watkins |
| 6,111,600 | A | | 8/2000 | McLeod et al. |
| 6,116,290 | A | | 9/2000 | Ohrn et al. |
| 6,319,618 | B1 | | 11/2001 | Kelley et al. |
| 6,634,388 | B1 | | 10/2003 | Taylor et al. |
| 6,663,453 | B2 | | 12/2003 | Quigley et al. |
| 6,827,110 | B2 | | 12/2004 | Watkins |
| 6,933,438 | B1 | | 8/2005 | Watts et al. |
| 7,635,008 | B2 | | 12/2009 | Follett et al. |
| 7,664,356 | B2 | | 2/2010 | Koike et al. |
| 8,559,773 | B2 | | 10/2013 | Kordahi et al. |
| 8,714,206 | B2 | | 5/2014 | Jackson et al. |
| 8,714,879 | B1 | | 5/2014 | Lugo et al. |
| 2003/0026662 | A1 | * | 2/2003 | Vidal ...................... F16L 1/123 405/157 |
| 2003/0102043 | A1 | | 6/2003 | Field |
| 2004/0109228 | A1 | * | 6/2004 | Aronstam ............. E21B 47/123 359/341.3 |
| 2005/0095380 | A1 | | 5/2005 | Watkins et al. |
| 2005/0283276 | A1 | | 12/2005 | Prescott et al. |
| 2006/0081301 | A1 | | 4/2006 | Wilkinson |
| 2010/0034593 | A1 | | 2/2010 | Strong et al. |
| 2010/0229662 | A1 | | 9/2010 | Brower et al. |
| 2011/0017337 | A1 | * | 1/2011 | Kagoura ............... F16L 11/081 138/121 |
| 2012/0175005 | A1 | | 7/2012 | Andersen |
| 2012/0298216 | A1 | | 11/2012 | Geertsen |
| 2013/0068340 | A1 | * | 3/2013 | Chakkalakal ......... F16L 59/143 138/149 |
| 2013/0170519 | A1 | | 7/2013 | Alliot et al. |
| 2014/0116556 | A1 | | 5/2014 | Critsinelis et al. |
| 2014/0144537 | A1 | | 5/2014 | Peters et al. |
| 2014/0241810 | A1 | | 8/2014 | Lynch et al. |
| 2015/0354728 | A1 | | 12/2015 | Ramslie |
| 2018/0023731 | A1 | | 1/2018 | Varkey et al. |

FOREIGN PATENT DOCUMENTS

| | | | |
|---|---|---|---|
| EP | 2563544 | | 3/2013 |
| JP | 5800026 A | * | 1/1983 |
| JP | 58000026 | | 1/1983 |
| JP | 05060922 A | * | 3/1993 ........... G02B 6/4463 |
| WO | 03074926 | | 9/2003 |
| WO | 2007085013 | | 7/2007 |
| WO | 2011067589 | | 6/2011 |
| WO | 2014114620 | | 7/2014 |
| WO | 2016085477 | | 6/2016 |
| WO | 2016085478 | | 6/2016 |
| WO | 2016085479 | | 6/2016 |

OTHER PUBLICATIONS

International Patent Application No. PCT/US2014/067423, International Search Report and Written Opinion, dated Aug. 19, 2015, 22 pages.
U.S. Appl. No. 14/912,012, "Advisory Action", dated Oct. 18, 2017, 6 pages.
U.S. Appl. No. 14/912,012, "Final Office Action", dated Aug. 1, 2017, 17 pages.
U.S. Appl. No. 14/912,012, "Non Final Office Action", dated Apr. 12, 2017, 11 pages.
U.S. Appl. No. 14/912,012, "Non-Final Office Action", dated Nov. 27, 2017, 14 pages.
International Patent Application No. PCT/US2014/067404, "International Preliminary Report on Patentability", dated Jun. 8, 2017, 10 pages.
International Patent Application No. PCT/US2014/067409, "International Preliminary Report on Patentability", dated Jun. 8, 2017, 10 pages.
International Patent Application No. PCT/US2014/067418, "International Preliminary Report on Patentability", dated Jun. 8, 2017, 10 pages.
U.S. Appl. No. 14/912,012, Final Office Action dated May 25, 2018, 15 pages.
U.S. Appl. No. 14/912,012, Non-Final Office Action, dated Sep. 10, 2018, 14 pages.

\* cited by examiner

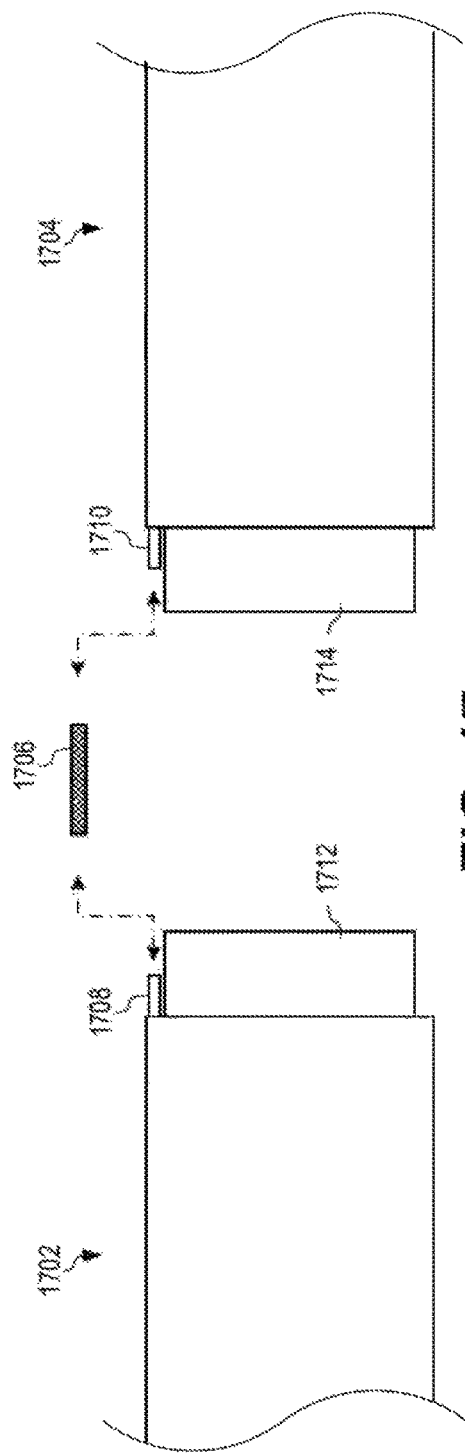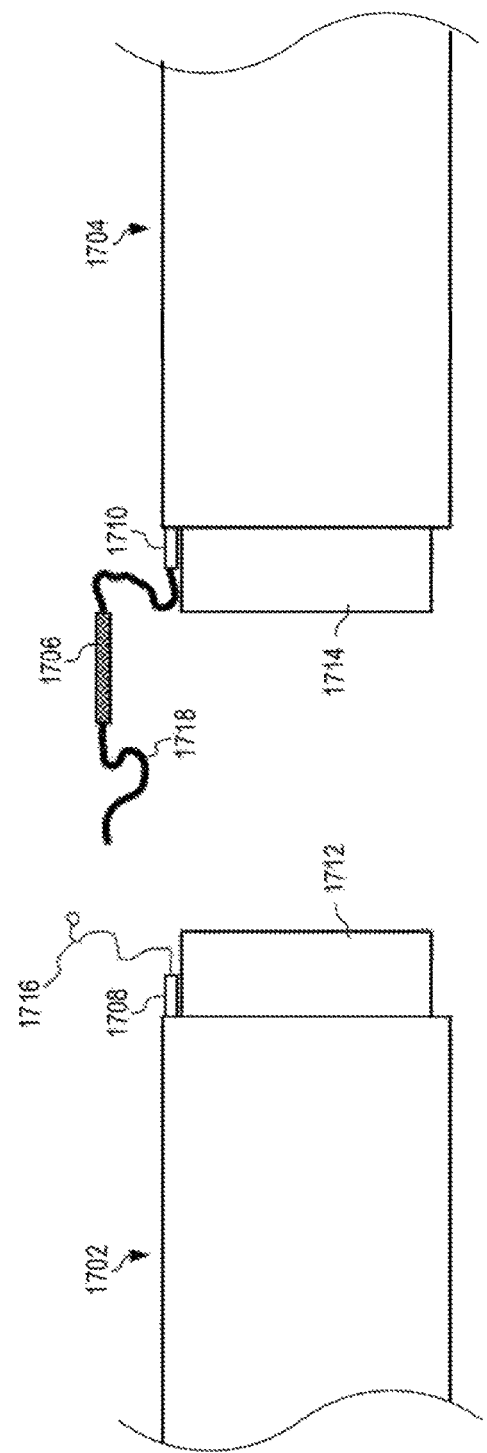

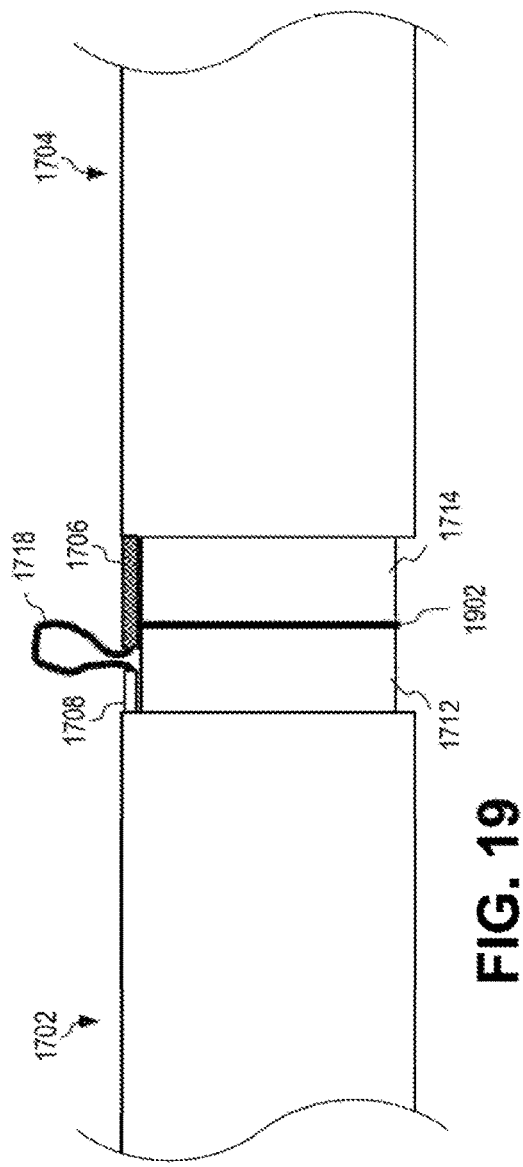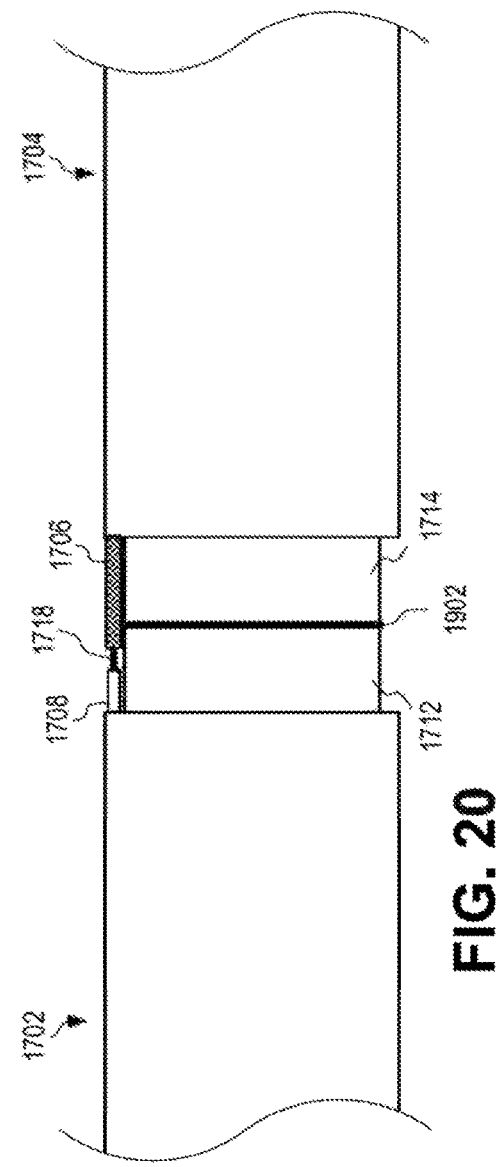

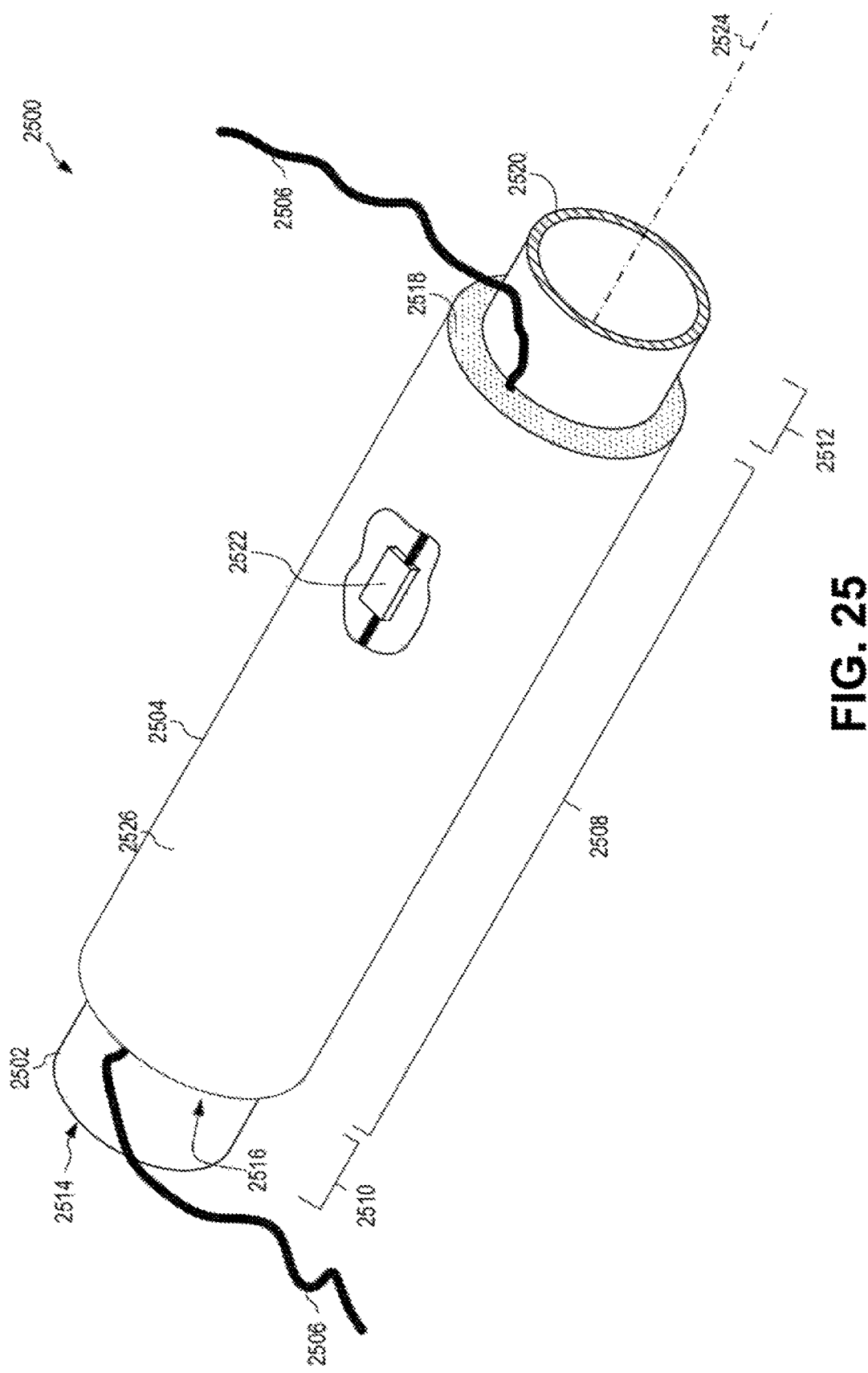

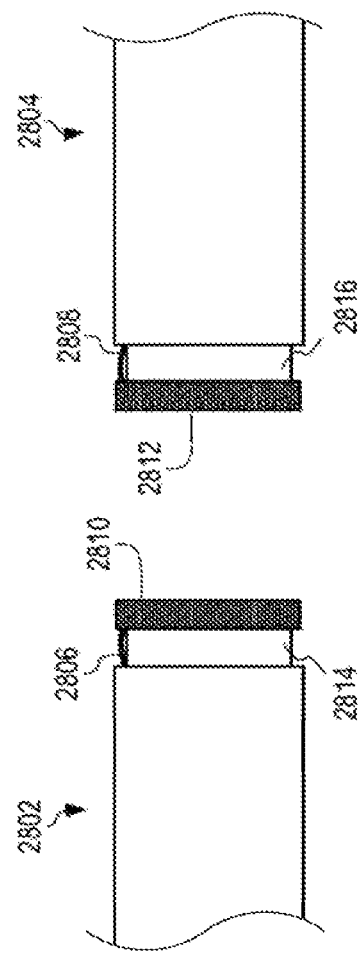

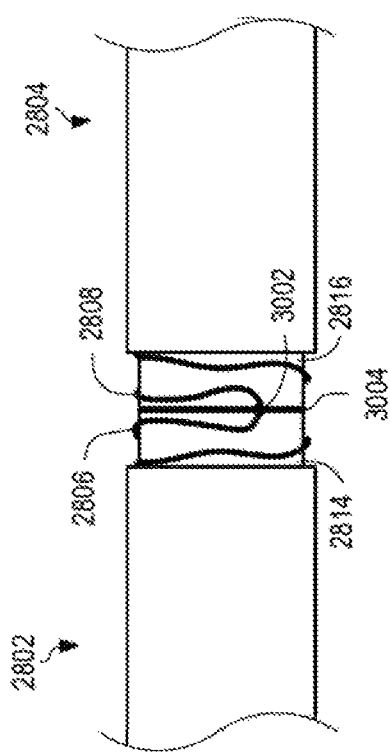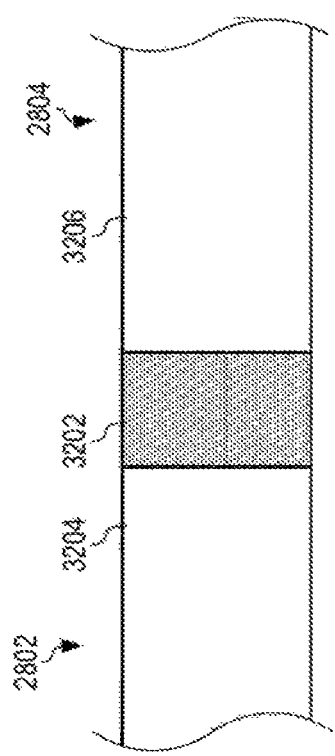

SMART SUBSEA PIPELINE

CROSS-REFERENCE TO RELATED APPLICATIONS

This is a continuation of International Patent Application No. PCT/US2014/067423, titled "Smart Subsea Pipeline" and filed Nov. 25, 2014, the entirety of which is incorporated herein by reference.

TECHNICAL FIELD

The present disclosure relates to pipeline construction generally and more specifically to pipelines suitable for data transmission.

BACKGROUND

Pipelines are used around the world to carry many materials, such as hydrocarbons like oil and gas. Pipelines can be constructed of numerous pipe segments connected together. Each pipe segment includes an inner diameter through which the hydrocarbon is carried aad may include insulation material. Insulation material can be selected to protect the pipe segment itself, such as from impact, abrasion, or corrosion, or can also be used to protect the pipeline contents, such as from intense heat. Insulation material used around a pipe segment can depend on the type of pipe segment, the type of material carried by the pipe segment, and the location where the pipe segment will be placed. Pipelines may be run on land, underground, under water (e.g., subsea), or elsewhere.

BRIEF DESCRIPTION OF THE DRAWINGS

The specification makes reference to the following appended figures, in which use of like reference numerals in different figures is intended to illustrate like or analogous components

FIG. 17 is a side view illustrating two pipeline segments having conduits before being coupled together according to certain features of the disclosed subject matter.

FIG. 18 is a side view illustrating two pipeline segments having conduits with a cable pulled through a bridge coupler according to certain features of the disclosed subject matter.

FIG. 19 is a side view illustrating two pipeline segments having conduits being welded together according to certain features of the disclosed subject matter.

FIG. 20 is a side view illustrating two pipeline segments welded together having a cable fed through respective conduits according to certain features of the disclosed subject matter.

FIG. 25 is an isometric view illustrating a pipeline segment having a cable embedded in insulation material according to certain features of the disclosed subject matter.

FIG. 28 is a side view illustrating two pipeline segments having cables stored in cable protectors according to certain features of the disclosed subject matter.

FIG. 31 is a side view illustrating two pipeline segments welded together having cables wrapped around the weld according to certain features of the disclosed subject matter.

FIG. 32 is a side view illustrating two pipeline segments having supplemental insulation material over the weld according to certain features of the disclosed subject matter.

DETAILED DESCRIPTION

Figure 1:
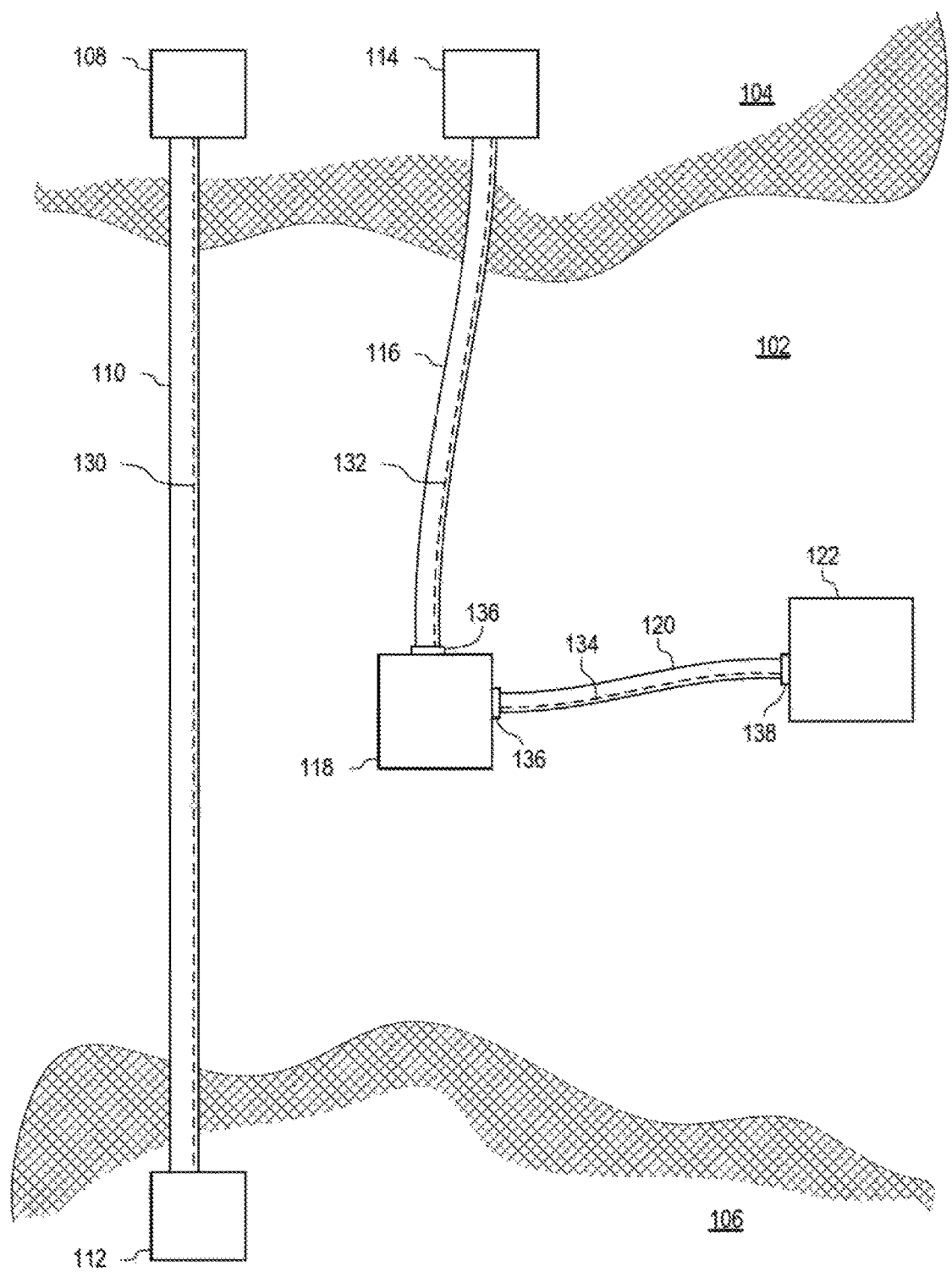
FIG. 1 is an overhead plan view illustrating the placement of pipelines having embedded cables according to certain features of the disclosed subject matter.

Certain aspects and features of the present disclosure relate to pipelines and pipeline segments containing cables, such as communication cables (e.g., fiber optic cables) within insulation material surrounding the pipeline segments. In some embodiments, cables can be embedded within the insulation material. In some embodiments, cables can be run through conduits embedded within the insulation material. In some embodiments, cables can be placed in channels formed in the insulation material, after which the channels can be filled with supplemental insulation material, thus securing the cables within the channels. Pipelines created using the embodiments disclosed herein can enable data transfer between distant points without the need to lay fiber optic cable in addition to the pipeline. The fiber optic cable will additionally be protected by the insulation of the pipeline. Further, fiber optic cable embedded thusly can be used to sense conditions in the pipeline, such as leaks, seismic activity, strain, and temperature information.

Subsea pipelines can be constructed by welding multiple segments of pipe together. Pipe segments can be approximately 60 feet or longer, although other sizes of pipe can be used. Each pipe segment can include a base pipe covered with an insulating material. The pipe segments are welded at their ends. Welding stations on pipelaying vessels can be used to weld pipe segments together when the pipeline is being constructed and laid. Various embodiments disclosed herein allow cables, such as optical cables, to be positioned within the insulation material of a pipeline.

The insulation material can cover the base pipe in multiple layers. The base pipe can be covered with a corrosion proof surface coating adjacent. The base pipe can be subsequently coated with various insulation materials.

Cables positioned in the insulation material of a pipeline segment can be used to sense conditions of the pipeline segment and perform other operations. For example, optical cables can be used as distributed acoustic sensors to determine conditions of the pipeline or materials flowing in the pipeline. In another example, electrical cables can be used as resistive heaters to heat the pipeline or segments of the pipeline. In an example electrical cables and optical cables are positioned in the insulation material of the pipeline, the electrical cables providing power to optical amplifiers or repeaters for the optical cables. Cables can be used to provide telecommunication across distances, obviating the need for additional cable drops between locations served by the pipeline. Telecommunication bandwidth provided through the pipeline can be sold to compensate for portions of the cost of installing the pipeline. Other uses can be made and other cable types can be used.

In an embodiment, pipe segments are disclosed having insulation materials with channels formed in the insulation material. The channels can be of a depth to allow for optimal temperature or leak detection by distributed thermal sensing (DTS) or distributed acoustic sensing (DAS) fiber optic cables. The channels can be sufficiently deep to allow an optical cable to be placed directly adjacent the base pipe. Channels can be formed in insulation on a pipeline segment by mechanical means, such as using a suitable routing instrument for removing insulation material to a suitable depth and channel diameter. In some embodiments, channels can be cut into the insulation material using a hot knife or similar instrument. In some embodiments, channels can be formed in the insulation on a pipeline segment by applying force to an embossing element to deform the insulation material. In some embodiments, channels can be formed in the insulation material through the use of a mold when the insulation material is applied to (e.g., extruded on) the base pipe. When the mold is removed, the channel can remain. In some embodiments, the channel can include a lip of insulation material. The lip of insulation material can occur when the largest width of the channel occurs below the surface of the insulation material.

Pipeline segments containing channels can be coupled together, such as on a pipelaying vessel. Pipeline segments can be welded together, such as at a welding station. Channels on adjacent pipeline segments can be aligned to define a continuous channel along the length of two or more pipeline segments coupled together. A cable, such as a fiber optic cable, can be laid continuously within the channels of adjacent pipeline segments. The cable can be fed from a reel or spool. The cable can be DTS cable, DAS cable, telecommunications cable, or any other suitable cable. The cable can be electrical cable. In some embodiments, multiple cables (e.g., a fiber optic cable and an insulated electrical cable) can be laid in the channels. In some embodiments, a conduit can be laid in the channel. Supplemental insulation material can be deposited in the channel to bury or secure the cable or conduit within the channel. Supplemental insulation material can be a resin insulation material or my other suitable insulation material. In some embodiments, placement of the cable within the channel and sealing of the channel using the supplemental insulation material can all occur on a pipelaying vessel, resulting in a pipeline having an embedded cable or conduit.

In some embodiments, additional components can be connected to the cable and buried in suitable supplemental insulation material. Such components can include optical amplifiers, electrical repeaters, or other suitable components. Components can be coupled to a single cable or multiple cables within one or more channels. For example, an electrical cable can be embedded in a channel to power an electrical amplifier that is designed to amplify an optical signal being sent through an optical cable also embedded in the channel. In some embodiments, the insulation material of a pipeline segment can include a recess sized to fit the additional component, allowing the component to be buried and secured within the recess similarly to the cable being buried and secured within the channel. The recess can intersect the channel, allowing the component to be placed in-line with the cable.

In an embodiment, a channel in insulation material can run parallel the longitudinal axis of the base pipe. In an embodiment, a channel in insulation material can run along a path that is not parallel the longitudinal axis of the base pipe, such as in a spiraling path (e.g., a helical path).

In an embodiment, pipeline segments can include conduits embedded within the insulation material. The conduits can be integrated with the pipeline segment at the point of insulation material installation. For example, the conduits can be placed adjacent the base pipe when insulation material is being applied to the base pipe (e.g., through an extrusion process or other process), thus allowing insulation material to surround the conduit as well as the base pipe. During installation, one or more conduits oriented in a desired configuration along the length of the base pipe (e.g., parallel with the longitudinal axis of the base pipe, or not parallel), and attached to the base pipe with a circumferential band attachment mechanism. The one or more conduits can be attached to the base pipe after the exterior surface of the base pipe is coated with at least one anticorrosive material. Additional layers of suitable insulation material can be extended onto the surface of the base pipe, thus embedding the one or more conduits in the insulation material.

In some embodiments, a drag line can be installed (e.g., by hand or machine) within each conduit of each pipeline segment. When coupling two pipeline segments together, the drag lines of adjacent pipeline segments can be coupled together (e.g., using a connector). At the welding region where two adjacent pipeline segments are welded together, a bridge coupler can be used to couple the conduits of the adjacent pipeline segments together. The bridge coupler can be a short length of conduit long enough to extend between the conduits of the adjacent pipeline segments when the base pipes of the adjacent pipeline segments are welded together (e.g., slightly longer than the distance between the conduits). The bridge coupler can have an inner diameter slightly larger than the outer diameter of the conduits, allowing the bridge coupler to be held in place through a friction fit. After a bridge coupler is attached between the conduits, the welding region, including any exposed areas of the conduits and the bridge coupler, can be covered in suitable supplemental insulation material. In an embodiment, additional glues or adhesives are not necessary to secure the bridge coupler to the conduits because the friction fit and the depositing of supplemental insulation material sufficiently secure the bridge coupler in place.

A drag line can be coupled to a cable, such as a fiber optic cable. The drag line can be pulled through the conduit to position the cable within the conduit. Multiple drag lines can be coupled together to pull a cable through multiple conduits. In an embodiment, the fiber optic cable can be pumped through the conduit using a pumping fluid. In an embodiment, the fiber optic cable can be pumped and pulled through the conduit. In an embodiment, each conduit can be electrically conductive and can be electrically insulated from the base pipe.

In an embodiment, lengths of cable (e.g., fiber optic cable) can be pre-installed in a conduit. When coupling together adjacent pipeline segments, the cables of adjacent pipeline segments can be coupled together (e.g., spliced, in the case of optical cables). In an embodiment, a first pipeline segment includes a cable pre-installed in the conduit, the cable being sufficiently long enough to extend through multiple pipeline segments. As additional pipeline segments are coupled to the first pipeline segment, the cable can be fed (e.g., pulled or pushed) through the conduits of the additional pipeline segments. In an embodiment, the first pipeline segment can include a cable termination. In an embodiment, the cable termination is an underwater optical cable coupling.

In an embodiment, a conduit embedded in insulation material can run parallel the longitudinal axis of the base pipe. In an embodiment, a conduit embedded in insulation material can run along a path that is not parallel the longitudinal axis of the base pipe, such as in a spiraling path (e.g., a helical path). One or more conduits can be embedded in the insulation material of a single pipeline segment.

In an embodiment, a cable is embedded in insulation material of a pipeline segment. The cable can be integrated into the insulation material of a pipeline segment at the point of insulation material installation. One or more cables can be oriented in a desired configuration along the length of a base pipe. The one or more cables can be attached to the base pipe with a circumferential band attachment mechanism. The one or more cables can be attached to the base pipe after the exterior surface of the base pipe has been coated with an anticorrosive material. The one or more cables can be attached directly to the base pipe, before an anticorrosive material has been applied. Layers of suitable insulation materials can be extruded onto the surface of the base pipe, thus embedding the one or more cables within the insulation material of the pipeline segment.

When adjacent pipeline segments are coupled together, the cables of the adjacent pipeline segments can be coupled together (e.g., spliced together using fusion splicing, in the case of optical cables). The cables can be coupled together adjacent the welding region, where the ends of the base pipes of adjacent pipeline segments are welded together. The cables can be coupled together before, while, or after the base pipes are welded together. After the base pipes are welded together, the cables can be wrapped around the welding region. Suitable supplemental insulation material can be applied to the welding region to cover the welding region, thus additionally covering the cables and embedding them in the supplemental insulation material.

In an embodiment, a component, such as an amplifier or repeater, can be coupled to a cable. The component can be coupled in-line with the cable and can be embedded in the insulation material of a pipeline segment. In another embodiment, the component can be coupled between the cables of adjacent pipeline segments. The component can be embedded within the supplemental insulation material used to cover the welding region.

In an embodiment, a cable embedded in insulation material can run parallel the longitudinal axis of the base pipe. In an embodiment, a cable embedded in insulation material can run along a path that is not parallel the longitudinal axis of the base pipe, such as in a spiraling path (e.g., a helical path), a zig-zag path, or any other path. One or more cables can be embedded in the insulation material of a single pipeline segment.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative embodiments but, like the illustrative embodiments, should not be used to limit the present disclosure. The elements included in the illustrations herein may be drawn not to scale.

FIG. 1 is an overhead plan view illustrating the placement of pipelines 110, 116, 120 having embedded cables 130, 132, 134 according to certain features of the disclosed subject matter.

In an embodiment, a pipeline 110 can carry materials, such as hydrocarbons, between a first surface location 108 and a second surface location 112. The pipeline 110 can remain aboveground for the duration of the distance, or can be placed undersea for a portion of the distance. First surface location 108 can be positioned on a first land area 104 and second surface location 112 can be positioned on a second land area 106. The first land area 104 and second land area 106 can be separated by a sea 102. Reference to sea and subsea as used herein can apply as well to oceans, lakes, ponds, and other suitable water features. The pipeline 110 can pass from the first surface location 108 to the second surface location 112, through the sea 102, along the seabed of the sea 102. The pipeline 110 can be made of one or more pipeline segments.

The pipeline 110 can include a cable 130 positioned within the insulation material of the pipeline 110. More than one cable 130 can be positioned within the insulation material of the pipeline 110. The cable 130 can be an electrical cable, an optical cable, or another type of cable. The cable 130 can enable sensing and other functionality within the pipeline 110 itself. The cable 130 can transmit information or signals between the first surface location 108 and the second surface location.

In an embodiment, a third surface location 114 can be positioned on a first land area 104 and a first subsea location 118 can be positioned within the sea 102, such as on or near the seabed of the sea 102. A pipeline 116 can connect the third surface location 114 and the first subsea location 118 for the transport of materials, such as hydrocarbons. Pipeline 116 can also include a cable 132 positioned within the insulation material of the pipeline 116, as described above with reference to pipeline 110 and elsewhere herein. The cable 132 can enable sensing and other functionality within the pipeline 116 itself. The cable 132 can transmit information or signals between the third surface location 114 and the first subsea location 118. The pipeline 116 can include a subsea coupling 136 suitable for establishing electrical, optical, or other communication between the cable 132 and the first subsea location 118. In an example, the subsea coupling 136 is a fiber optic coupling suitable for use underwater.

In an embodiment, a second subsea location 122 can be positioned within the sea 102, such as on or near the seabed of the sea 102. A pipeline 120 can connect the first subsea location 118 and the second subsea location 122 for the transport of materials, such as hydrocarbons. Pipeline 120 can also include a cable 134 positioned within the insulation material of the pipeline 120, as described above with reference to pipeline 110 and elsewhere herein. The cable 134 can enable sensing and other functionality within the pipeline 120 itself. The cable 134 can transmit information of signals between the first subsea location 118 and the second subsea location 122. The pipeline 120 can include subsea couplings 136 suitable for establishing electrical, optical, or other communication between the cable 134 and both the first subsea location 118 and the second subsea location 122.

First subsea location 118, second subsea location 122, or both can be underwater well manifolds. First surface location 108, second surface location, 112, third service location 114, or any combination thereof can be hydrocarbon service centers.

In an embodiment, the pipeline 110, 116, 120 is a deep-water pipeline. In an embodiment the pipeline 110, 116, 120 is a coiled or spooled pipe. In an embodiment, the pipeline 110, 116, 120 is constructed of multiple pipeline segments (e.g., joint pipes).

The cables 130, 132, 134 can enable various functionality in the pipelines 110, 116, 120. An example functionality is the ability to transmit data, such as telecommunication data, across distances spanned by the pipelines 110, 116, 120. An example functionality is the ability to perform distributed sensing (e.g., distributed acoustic sensing or distributed temperature sensing) of the pipelines 110, 116, 120 by the cables 130, 132, 134. An example functionality is the ability to provide heat to the pipelines 110, 116, 120 (e.g., when cables 130, 132, 134 are electrical heating cables). Other functionalities can be enabled.

In an embodiment, a pipeline as disclosed herein can be used as a trunk line. In an embodiment, a pipeline as disclosed herein can be used as a transmission line. In an embodiment, a pipeline as disclosed herein can be used as a service line.

Figure 2:
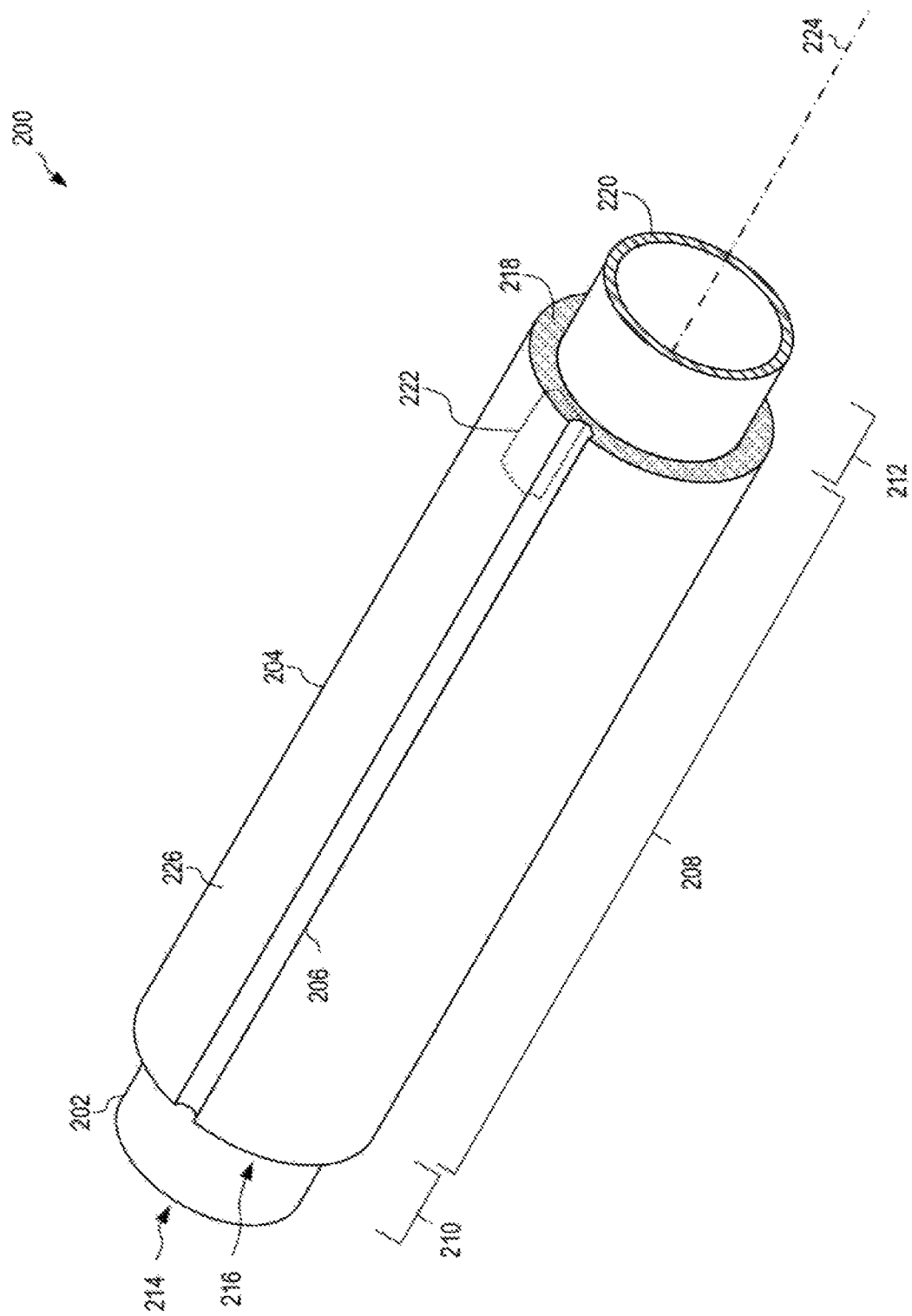
FIG. 2 is an isometric view illustrating a pipeline segment having a channel according to certain features of the disclosed subject matter.

FIG. 2 is an isometric view illustrating a pipeline segment 200 having a channel 206 according to certain features of the disclosed subject matter. Pipeline segment 200 includes a base pipe 202 having a first end 214 and a second end 220. The base pipe 202 has a longitudinal axis 224 extending parallel to the length of the base pipe 202. The base pipe includes a first non-insulated end region 210 and a second non-insulated end region 212 separated by an insulated region 208. The insulated region includes insulation material 204 coupled to or otherwise coating the base pipe 202. The insulation material 204 has a first end 216 and a second end 218.

A channel 266 is formed in the insulation material 204. The channel 206 can be formed by any suitable process, such as cutting, embossing, molding, or otherwise. The channel 206 can extend from the first end 216 of the insulation material 204 to the second end 218 of the insulation material 204. The channel 206 can have a depth suitable to retain a cable without the cable extending beyond the surface 226 of the insulation material 204. Deeper and shallower channels 206 can be used. The channel 206 breaks through the surface 226 of the insulation material 204 (i.e., the interior of the channel 206 is accessible through an opening, such as a longitudinal gap, in the surface 226 of the insulation material 204).

In an embodiment, a recess 222 is optionally formed in the insulation material 204. The recess 222 can be formed by cutting, embossing, molding, or otherwise. The recess 222 can be sized to retain a component, such as an amplifier or a repeater. The recess 222 can have a depth suitable to retain the component without the component extending beyond the surface 226 of the insulation material 204. The recess 222 can be deeper or shallower, as well. The recess 222 can intersect the channel 206 for allowing a component to more easily interact with a cable in the channel 206. The insulation material 204 can include multiple recesses 222.

Multiple channels can be formed in the insulation material 204. A channel 206 can extend in a direction parallel to the longitudinal axis 224 of the base pipe 212. The channel 206 can follow a path thai is not parallel to the longitudinal axis 224 of the base pipe 202.

Figure 3:
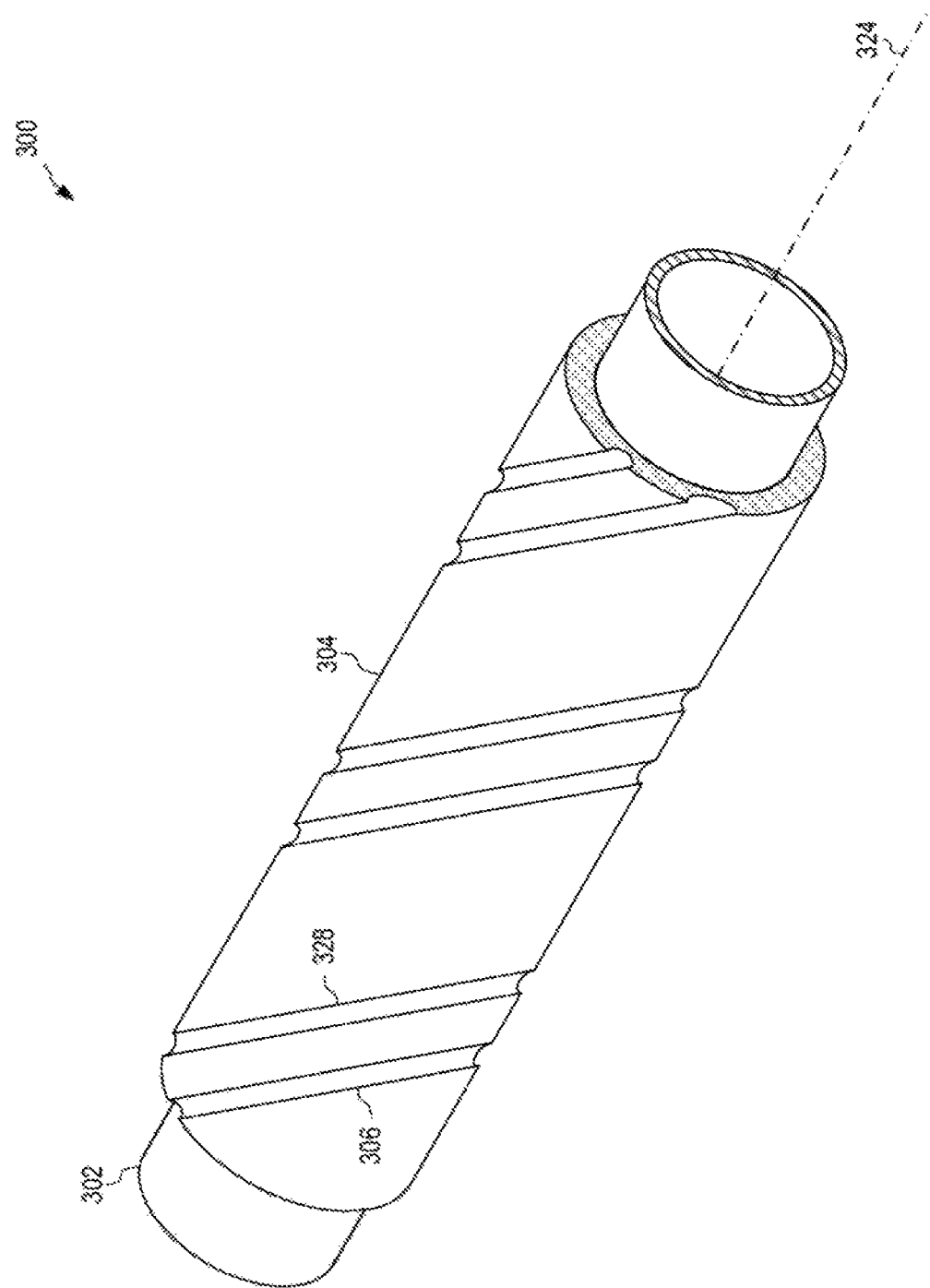
FIG. 3 is an isometric view illustrating a pipeline segment having multiple channels according to certain features of the disclosed subject matter.

FIG. 3 is an isometric view illustrating a pipeline segment 300 having multiple channels 306, 328 according to certain features of the disclosed subject matter. Channels 306, 328 are formed in the insulation material 304. Channels 306, 328 follow a path (e.g., a spiral path) that is not parallel to the longitudinal axis 324 of the base pipe 302. Channels can take paths of any shape, including zig-zag shape. In an embodiment, a pipeline segment can include channels that cross one another. In an embodiment, a pipeline segment can include channels that meet together at a recess.

Figure 4:
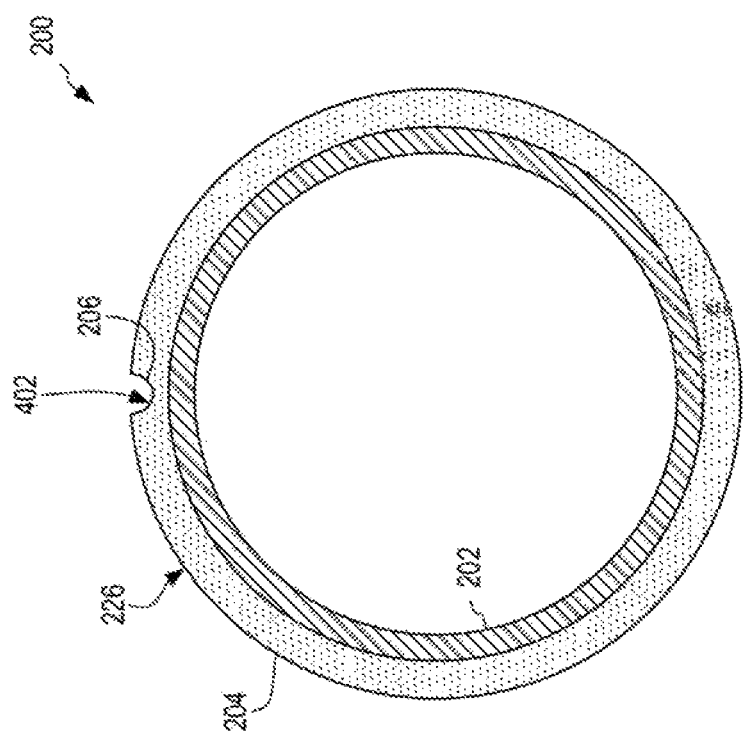
FIG. 4 is an end view illustrating the pipeline segment of FIG. 2 according to certain features of the disclosed subject matter.

FIG. 4 is an end view illustrating the pipeline segment 200 of FIG. 2 according to certain features of the disclosed subject matter. The insulation material 204 surrounds the base pipe 202. A channel 206 is formed in the insulation material 204, breaking through the surface 226 of the insulation material 204. Channel 206 can have any suitable cross-sectional shape, such as a circular, ellipsoidal, triangular, or other suitable shape. A pipeline segment 200 can include channels spaced at any suitable angular spacing around the insulation material 204.

As used herein, the term channel refers to an open groove formed in the surface of the insulation material. The groove formed in the surface of the insulation material includes a wall that is contiguous with the surface of the insulation material. Channel 206 is an open groove formed in the surface 226 (e.g., longitudinal surface) of insulation material 204. The wall 402 of channel 206 is contiguous with the surface 226 of insulation material 204. The wall 402 of channel 206 is contiguous with the surface 226 of insulation material 204 throughout the entire length of the channel 206.

Figure 5:
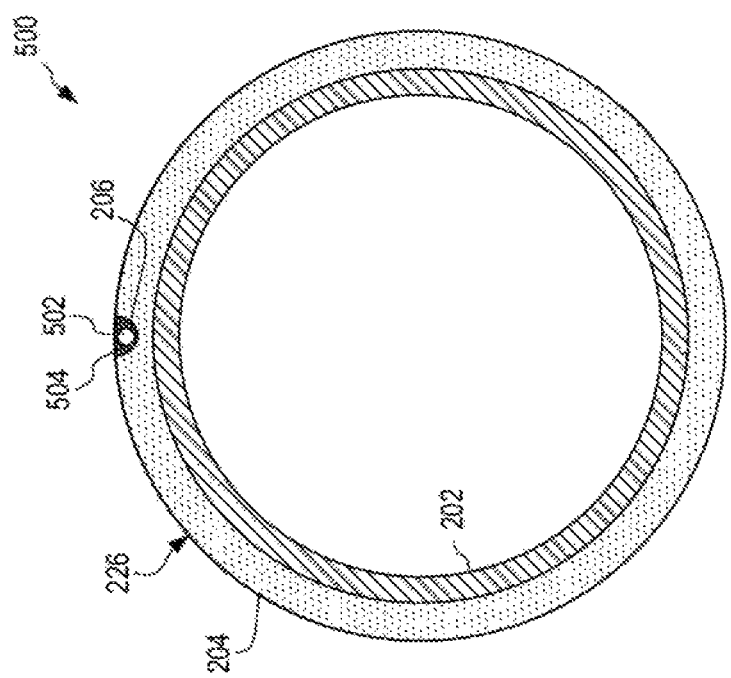
FIG. 5 is an end view illustrating a pipeline segment having a cable positioned within a channel according to certain features of the disclosed subject matter.

FIG 5 is an end view illustrating a pipeline segment 500 basing a cable 502 positioned within a channel 206 according to certain features of the disclosed subject matter. Insulation material 204 surrounds the base pipe 202. A channel 206 is formed in the insulation material 204. A cable 502, such as an optical cable, is positioned within the channel 206. Supplemental insulation material 504 is deposited within the channel 206. The supplemental insulation material 504 can be smoothed, trimmed, or otherwise treated to result in a smooth surface that is contiguous with the surface 226 of the insulation material 204.

In an embodiment, multiple cables can be positioned within a single channel 206. In an embodiment, small components can be positioned within a channel 206.

Figure 6:
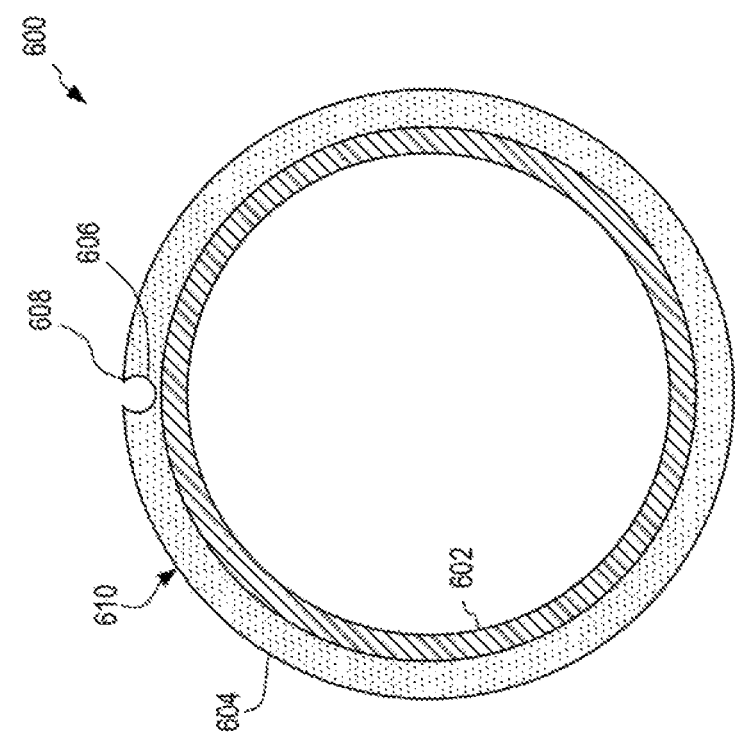
FIG. 6 is an end view illustrating a pipeline segment having a channel with a lip according to certain features of the disclosed subject matter.

FIG. 6 is an end view illustrating a pipeline segment 600 having a channel 606 with a lip 608 according to certain features of the disclosed subject matter. The insulation material 604 surrounds the base pipe 602. A channel 606 is formed in the insulation material 604, breaking through the surface 650 of the insulation material 604. A lip 608 is formed in the surface 610 of the insulation material 604 due to the depth and cross-sectional shape of the channel 606. The lip 608 can facilitate placement of a cable or retention of a cable within the channel 606 once the cable has been placed in the channel 606. The lip 608 can occur whenever the widest cross-sectional width of the channel 606 is wider than the opening formed by the channel 606 in the surface 610 of the insulation material 604. In other words, the lip 608 can occur whenever the widest cross-sectional width of the channel 606 is wider than the cross-sectional width of the channel 606 at the surface 610 of the insulation material 604.

Figure 7:
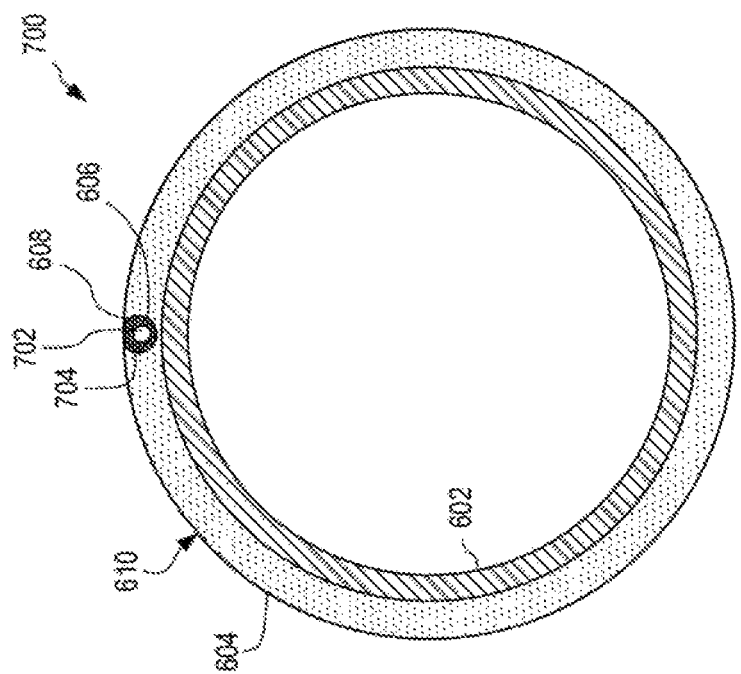
FIG. 7 is an end view illustrating a pipeline segment having a cable positioned within a channel with a lip according to certain features of the disclosed subject matter.

FIG. 7 is an end view illustrating a pipeline segment 700 having a cable 702 positioned within a channel 606 with a lip 608 according to certain features of the disclosed subject matter. Insulation material 604 surrounds the base pipe 602. A channel 606 is formed in the insulation material 604. A cable 702, such as an optical cable, is positioned within the channel 606. Supplemental insulation material 704 is deposited within the channel 606. The supplemental insulation material 704 can be smoothed, trimmed, or otherwise treated to result in a smooth surface that is contiguous with the surface 610 of the insulation material 604, including the lips 608.

Figure 8:
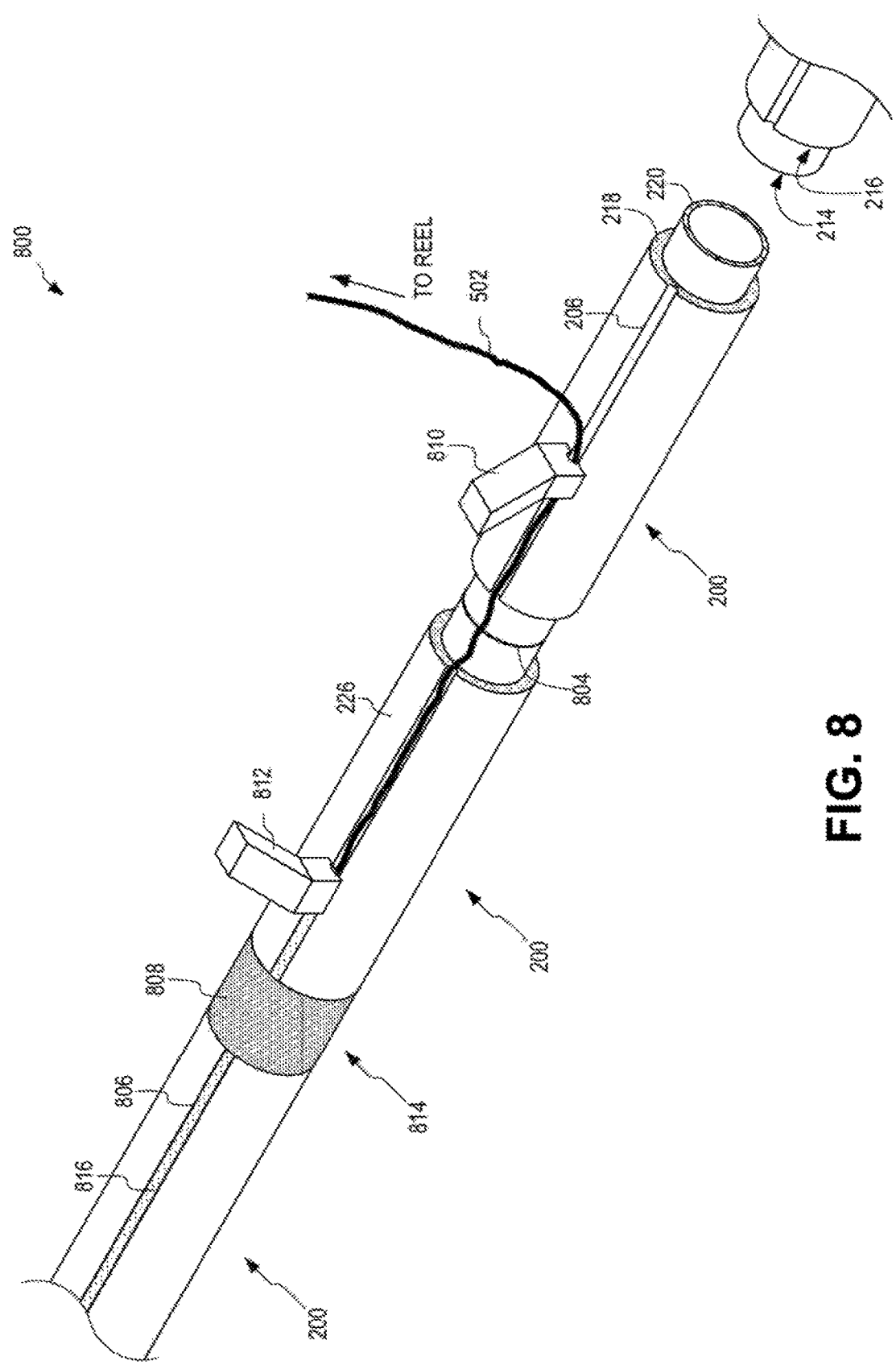
FIG. 8 is an isometric view illustrating a pipeline constructed of multiple pipeline segments with channels according to certain features of the disclosed subject matter.

FIG. 8 is an isometric view illustrating a pipeline 800 constructed of multiple pipeline segments 200 with channels 206 according to certain features of the disclosed subject matter. Several pipeline segments 200 can be coupled together, such as through welding. The second end 220 of a base pipe of a first pipeline segment can be welded to a first end 214 of the base pipe of a second pipeline segment, resulting in a weld 804 between the two base pipes. The channels 206 of adjacent pipeline segments may be aligned prior to welding.

After being welded together, a cable 302 can be positioned within the channel 206. In an embodiment, the cable 502 can be feed from a reel or spool and an insertion device 810 can position the cable 502 in the channel 206. A sealing device 812 can be used to apply supplemental insulation material 816 to the channel 206 to form a sealed channel 806. The supplemental insulation material 816 can secure the cable 502 within the channel 206. Supplemental insulation material 808 can also be placed over the weld 804, at a welding region 814, between the second end 218 of the insulation material 204 and the first end 216 of the insulation material 204 of adjacent pipeline segments 200.

Figure 9:
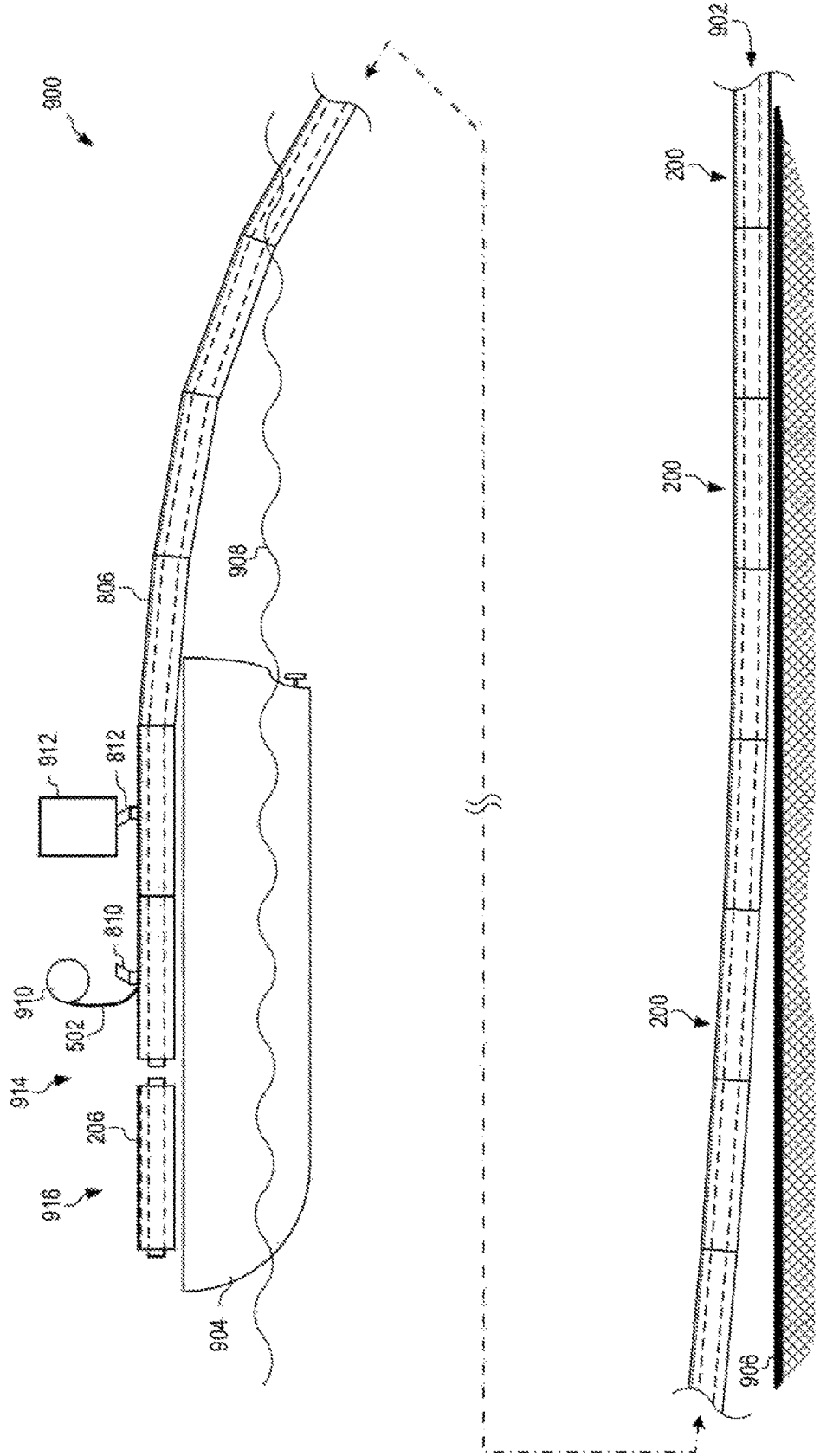
FIG. 9 is an elevation view illustrating a pipelaying vessel installing a pipeline having a cable positioned in channels according to certain features of the disclosed subject matter.

FIG. 9 is an elevation view illustrating a pipelaying vessel 904 installing a pipeline 902 having a cable 502 positioned in sealed channels 806 according to certain features of the disclosed subject matter. On the pipelaying vessel 904, multiple pipeline segments 200 can be coupled together, as seen in FIG. 8, to form a pipeline 902. On the pipelaying vessel 904, a new pipeline segment 916 having a channel 206 can be placed adjacent the existing pipeline 902 at a welding station 914. The base pipe of the new pipeline segment 916 can be welded to the adjacent base pipe of the pipeline segment at the end of the pipeline 902.

An insertion device 810 can feed cable 502 from a reel 910 and insert the cable 502 into the channels 206 of pipeline segments 200 of the pipeline 902. Further away from the new pipeline segment 916 than the insertion device 810, a sealing device 812 can deposit supplemental insulation material in the channel 206 to form a sealed channel 806. The sealing device 812 can be coupled to a supply of supplemental insulation material 912.

The pipelaying vessel 904 can be floating on a sea 908 or other water feature. As pipeline segments 200 are coupled together and pushed off the rear end of the pipelaying vessel 904, the pipelaying vessel 904 can be propelled forward. The pipeline segments 200 can be gradually pulled towards the seabed 906 by gravity. Eventually, when the pipeline 902 is sufficiently long, the pipeline 902 can rest of the seabed 906.

A subsea pipeline 902 having a cable 502 embedded in a sealed channel 806 can thus be created and installed. The disclosed process for creating and installing the pipeline 902 can occur, with slight variation, on land. In some embodiments, instead of passing the pipeline segments 200 past the insertion device 810 and sealing device 812, the insertion device 810 and sealing device 812 are passed over a stationary pipeline segment 200.

As described above with reference to FIGS. 2-9, any type of waveguide can be positioned within a channel (e.g., channel 206) instead of or in addition to a cable (e.g., cable 502). Waveguides can be optical waveguides (e.g., optical cables) or other suitable waveguides.

Examples of other suitable waveguides can include quasi-optical waveguides or far, far infrared waveguides. Waveguides can be used that operate using submillimeter waves, such as in the terahertz regime. Waveguides can operate between 100 gigahertz (GHz) and 10 terahertz (THz). Waveguides can operate between 500 GHz and 5 THz. Waveguides can operate at about 1 THz. Waveguides can include any conductive pipe having an inner diameter that is suitably constructed to propagate signals from one end of the waveguide to the opposite end of the waveguide.

A waveguide can be a waveguide pipe having an inner diameter. The waveguide pipe can be made of steel clad copper. The waveguide pipe can be made of any conductive material. The waveguide can be filled with an inert gas, such as nitrogen. The waveguide can be filled with a solid dielectric material. The waveguide can be filled with a transparent, solid dielectric material. The waveguide can be under one-half-inch in diameter. The waveguide can be under one-quarter-inch in diameter. Other sizes and types of waveguides can be used.

The waveguide can include one or more supplemental cables (e.g., optical cables) within the inner diameter of the waveguide pipe. As necessary, segments of waveguide pspe can be coupled together in a fashion that does not degrade signal propagation from one end of the waveguide to the other end of the waveguide. The waveguide can be used to communicate information from one end of the waveguide to the opposite end of the waveguide, such as described with reference to cables in FIG. 1.

Figure 10:
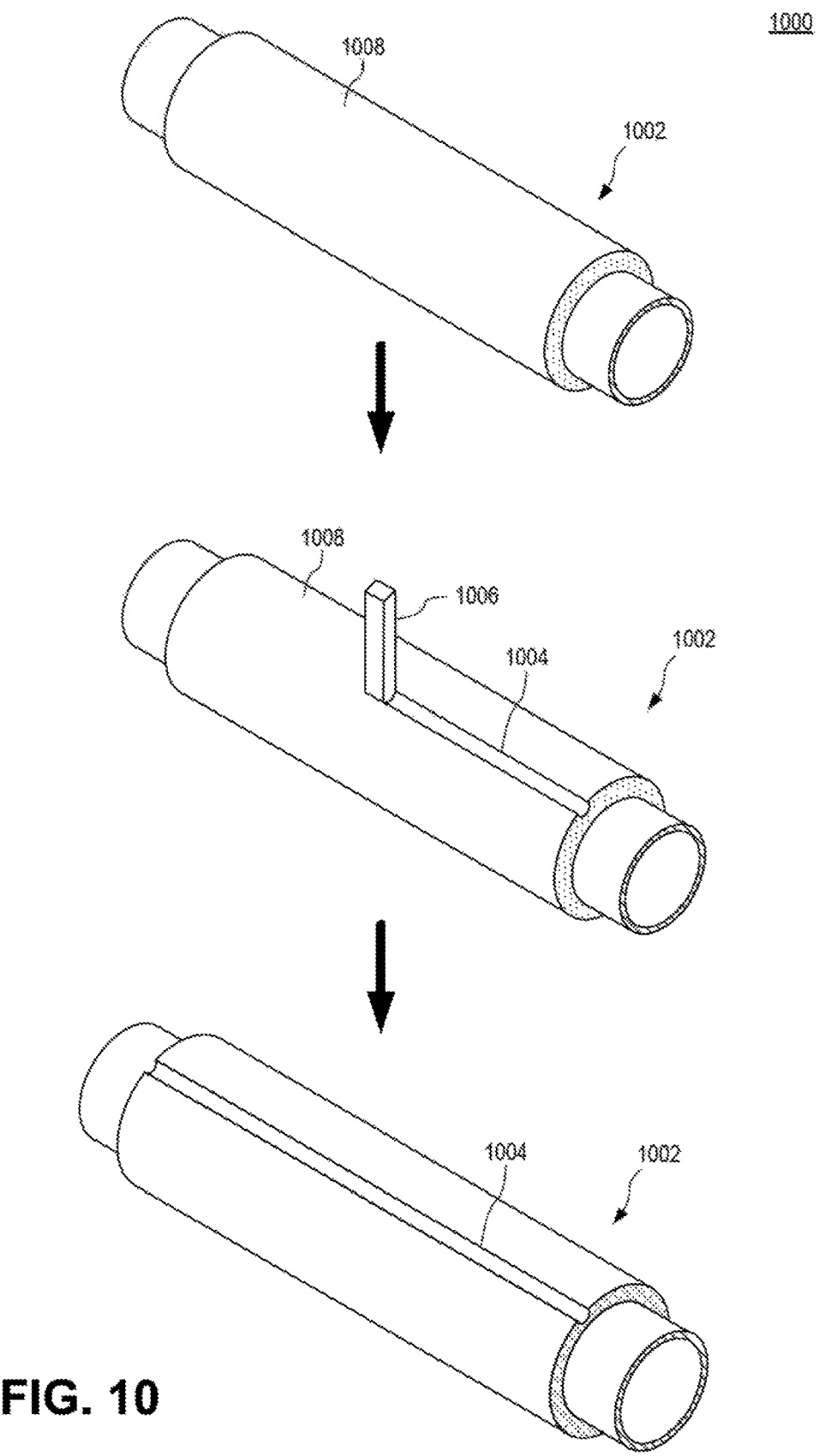
FIG. 10 is an isometric view illustrating a process for cutting a channel in a pipeline segment according to certain features of the disclosed subject matter.

FIG. 10 is an isometric view illustrating a process 1000 for cutting a channel 1004 in a pipeline segment 1002 according to certain features of the disclosed subject matter. A pipeline segment 1002 having insulation material 1008 can be provided. A cutting tool 1006, such as a router or other suitable tool, can be drawn past the pipeline segment 1002, cutting a channel 1004 in the insulation material 1008 in its path. In an embodiment, the cutting tool 1006 is stationary and the pipeline-segment 1002 moves. In an embodiment, the cutting loot 1006 can cut multiple channels 1004 in the insulation material 1008 at a time. The cutting tool 1006 may require one or more passes to cut a channel 1004 with the desired cross-sectional shape, depth, or both. The resultant pipeline segment 1002 includes a channel 1004 that has been cut into the insulation material 1008.

Figure 11:
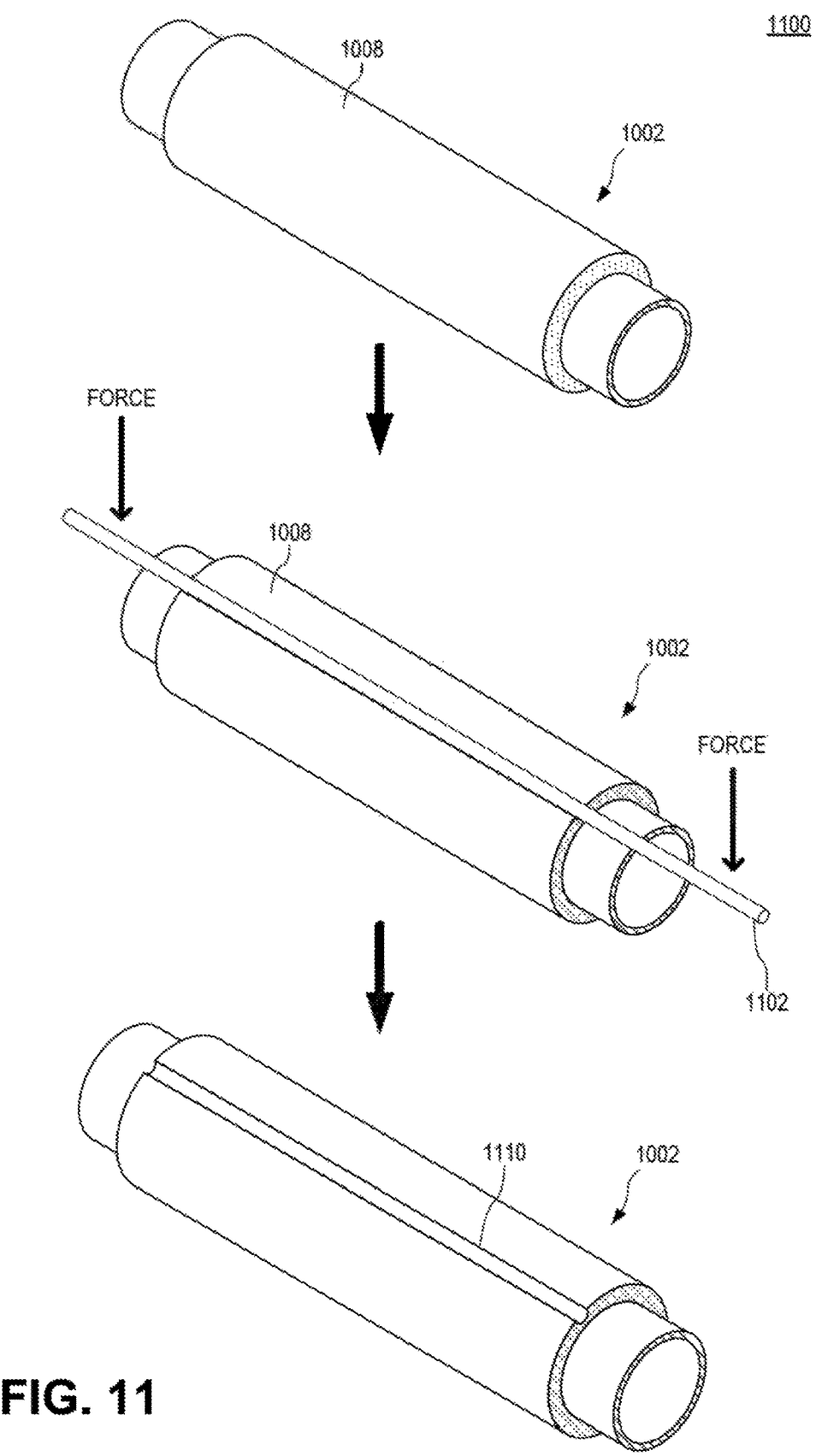
FIG. 11 is an isometric view illustrating a process for embossing a channel in a pipeline segment according to certain features of the disclosed subject matter.

FIG. 11 is an isometric view illustrating a process 1100 for embossing a channel 1110 in a pipeline segment 1002 according to certain features of the disclosed subject matter. A pipeline segment 1002 hating insulation material 1008 can be provided. An embossing tool 1102 in the shape of the desired channel can be pressed against the insulation material 1008 with sufficient force to form a permanent depression. In an embodiment, the embossing tool 1102 can be a heated tool. In an embodiment, the embossing process 1100 can occur at a suitable elevated temperature to facilitate forming the permanent depression. In an embodiment, the embossing tool 1102 is held stationary while the pipeline segment 1002 is pressed against the embossing tool 1102. The resulting pipeline segment 1002 includes a channel 1110 that has been embossed into the insulation material 1008.

Figure 12:
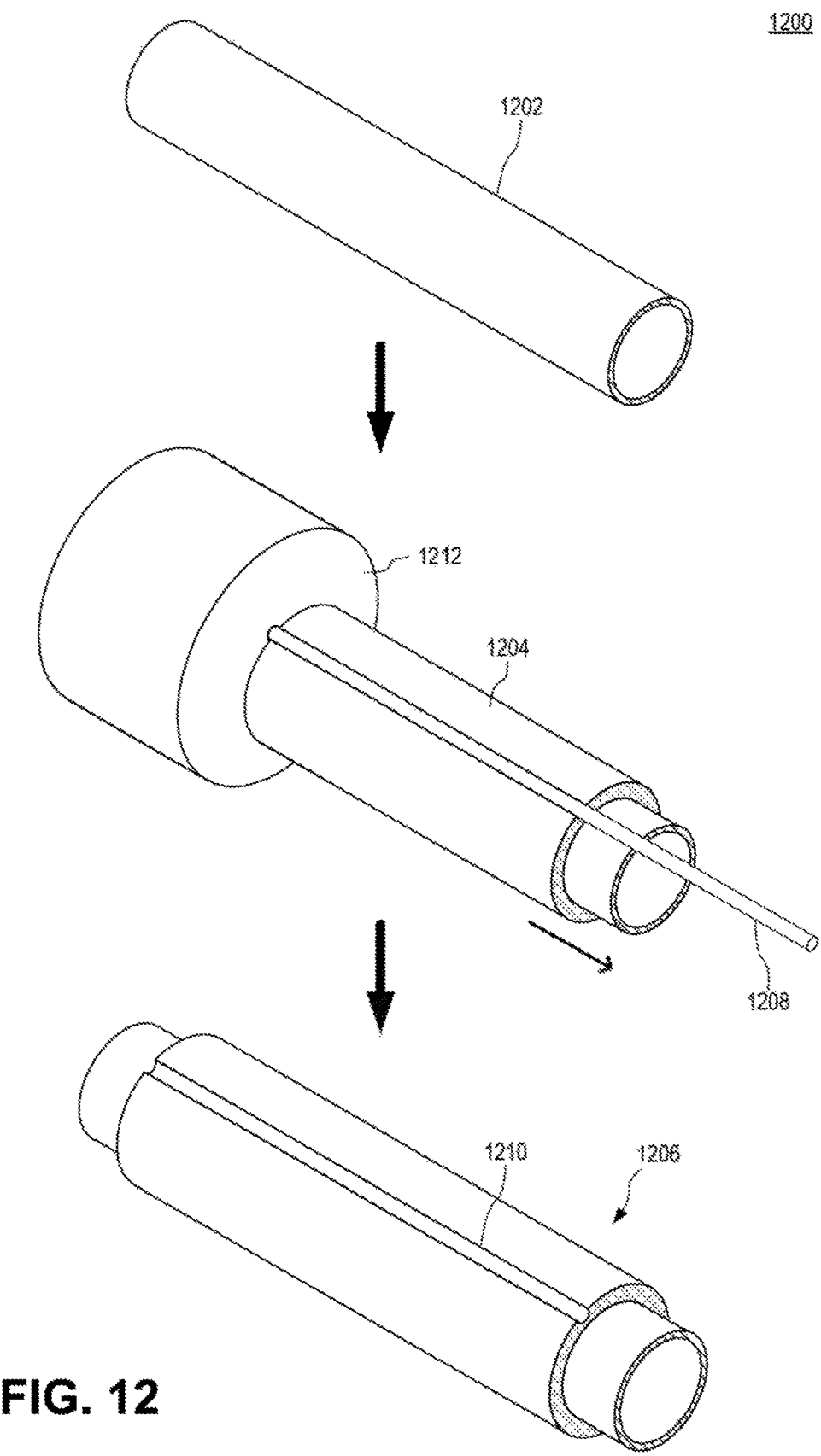
FIG. 12 is an isometric view illustrating a process for molding a channel in a pipeline segment according to certain features of the disclosed subject matter.

FIG. 12 is m isometric view illustrating a process 1200 for molding a channel 1210 in a pipeline segment 1206 according to certain features of the disclosed subject matter. A base pipe 1202 can be provided. Insulation material 1204 can be applied to the base pipe 1202 with a mold 1208 in place where the resultant channel is desired. In an embodiment, insulation material 1204 is applied to the base pipe 1202 using an extruder 1212. The extruder 1212 can include the mold 1208. Once the insulation material 1204 has sufficiently set, the mold 1208 can be removed, leaving the channel 1210. The resulting pipeline segment 1206 includes a channel 1210 that has been molded into the insulation material 1008.

Figure 13:
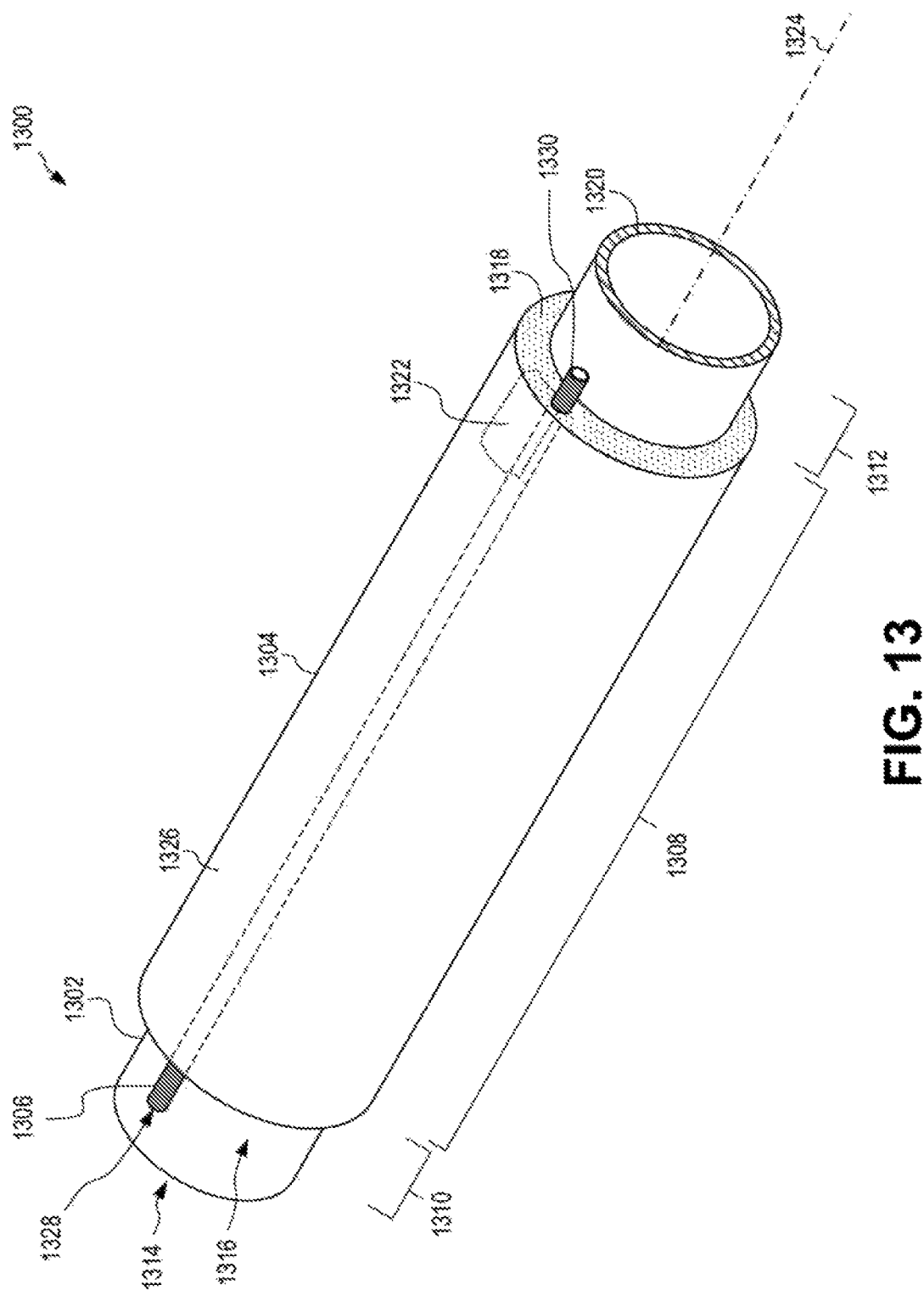
FIG. 13 is an isometric view illustrating a pipeline segment having a conduit according to certain features of the disclosed subject matter.

FIG. 13 is an isometric view illustrating a pipeline segment 1300 having a conduit 1306 according to certain features of the disclosed subject matter. Pipeline segment 1300 includes a base pipe 1302 having a first end 1314 and a second end 1320. The base pipe 1302 has a longitudinal axis 1324 extending parallel to the length of the base pipe 1302. The base pipe includes a first non-insulated end region 1310 and a second non-insulated end legion 1312 separated by an insulated region 1308. The insulated region includes insulation material 1304 coupled to or otherwise coating the base pipe 1302. The insulation material 1304 has a first end 1316 and a second end 1318.

A conduit 1306 is embedded in the insulation material 1304. The conduit 1306 can be embedded in the insulation material 1304 during installation of the insulation material 1304 on the base pipe 1302. The conduit 1306 can be inserted into the insulation material 1304 after excavating a suitable hole in the insulation material 1304, after the insulation material 1304 has already been installed on the base pipe 1302. The conduit 1306 can extend from the first non-insulated region 1310 to the second non-insulated region 1312. The conduit 1306 can extend further or less far. The conduit 1306 can be located at any suitable depth within the insulation material 1304, such as adjacent the surface 1326 of the insulation material 1304, adjacent the base pipe 1302, or anywhere in between. The conduit 1306 exits the insulation material 1304 at the first end 1316 and second end 1318. The conduit 1306 has a first end 1328 and a second end 1330.

In an embodiment, a recess 1322 is optionally formed in the insulation material 1304. The recess 1322 can be formed by cutting, molding, or any other suitable process. The recess 1322 can be sized to retain a component, such as an amplifier or a repeater. The recess 1322 can be at any suitable depth. The recess 1322 can be located adjacent and breaking through the first end 1316 or second end 1318 of the insulation material 1304 so that it can be more easily accessed. A component can be embedded in the insulation material 1304 during installation of the insulation material 1304 to the base pipe 1302. The recess 1322 can intersect the conduit 1306 for allowing a component to more easily interact with a cable in the conduit 1306. The insulation material 1304 can include multiple recesses 1322. The insulation material 1304 can include multiple components embedded therein.

Multiple conduits can be embedded in the insulation material 1304. A conduit 1306 can extend in a direction parallel to the longitudinal axis 1324 of the base pipe 1302. A conduit can follow a path that is not parallel to the longitudinal axis 1324 of the base pipe 1302.

The conduit 1306 can have any suitable inner and outer diameters. The conduit 1306 can be electrically conductive. The conduit 1306 can be positioned in the insulation material 1304 such that the conduit 1306 is electrically insulated from the base pipe 1302.

Figure 14:
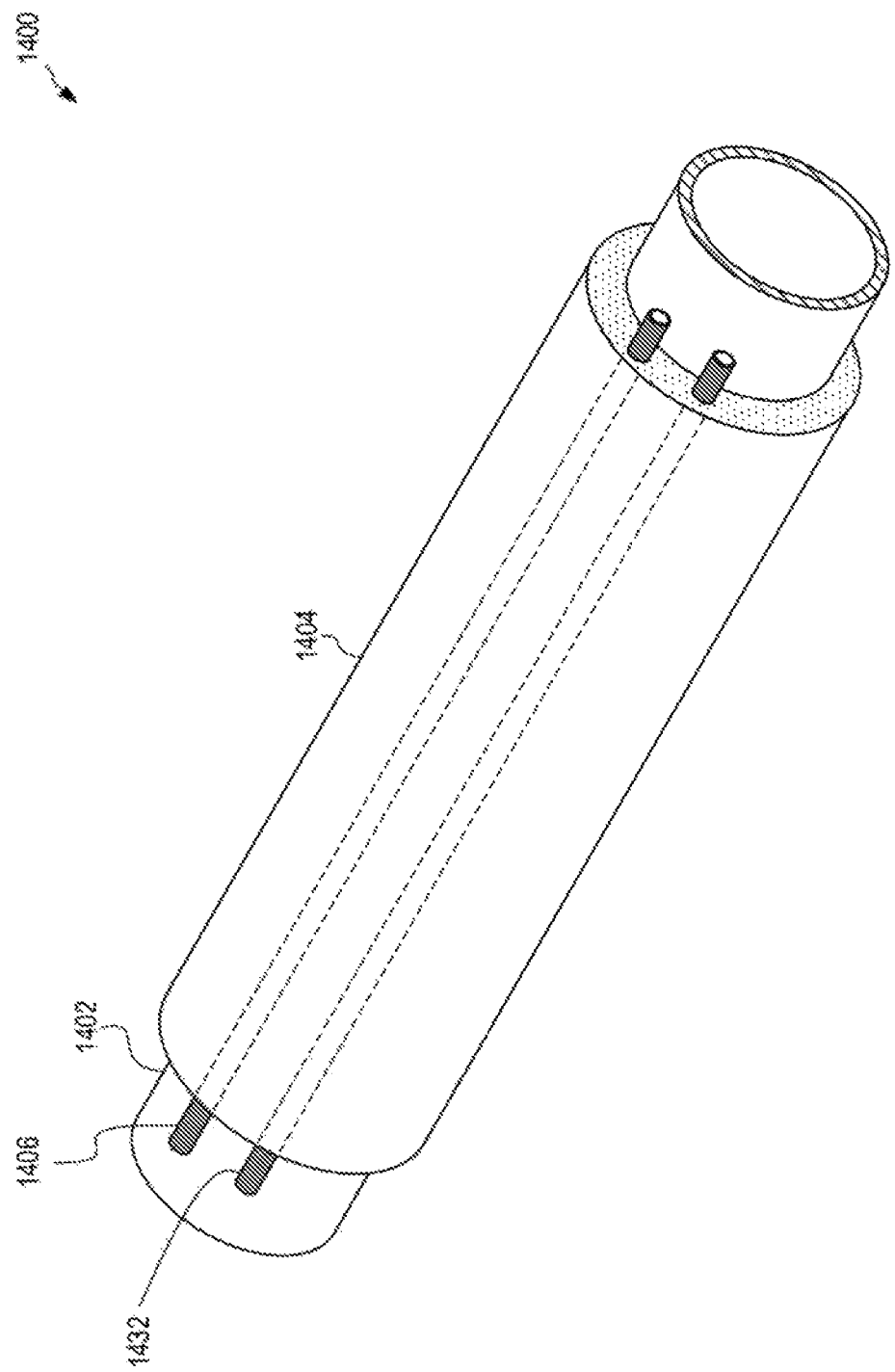
FIG. 14 is an isometric view illustrating a pipeline segment having multiple conduits according to certain features of the disclosed subject matter.

FIG. 14 is an isometric view illustrating a pipeline segment 1400 having multiple conduits 1406, 1432 according to certain features of the disclosed subject matter. A first conduit 1406 and a second conduit 1432 are both located within the insulation material 1404 of the pipeline segment 1400. Each conduit 1406, 1432 can be located at any depth within the insulation material 1404. The first conduit 1406 and second conduit 1432 can be located at the same or different depths within the insulation material. The first conduit 1406 and second conduit 1432 can have any suitable diameter. Each conduit 1406, 1432 can be electrically conductive. Each conduit 1406, 1432 can be electrically insulated from one another. Any suitable number of conduits can be embedded in the insulation material 1404. In an embodiment, a recess or component can intersect more than one conduit.

Figure 15:
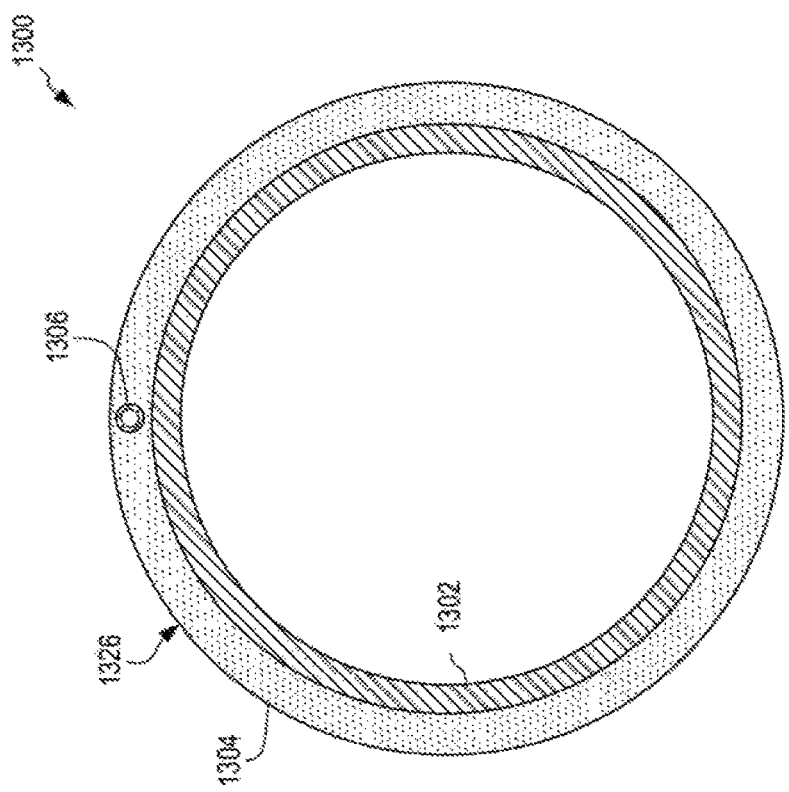
FIG. 15 is an end view illustrating the pipeline segment of FIG. 13 according to certain features of the disclosed subject matter.

FIG. 15 is an end view illustrating the pipeline segment 1300 of FIG. 13 according to certain features of the disclosed subject matter. Insulation material 1304 surrounds the base pipe 1302. A conduit 1306 is embedded in the insulation material 1304, under the surface 1326 of the insulation material 1304. Conduit 1306 can have any suitable cross-sectional shape, such as a circular, ellipsoidal, triangular, or other suitable shape. Conduit 1306 can have any suitable site (e.g., diameter). A pipeline segment 1300 can include conduits spaced at any suitable angular spacing around the insulation material 1304.

Figure 16:
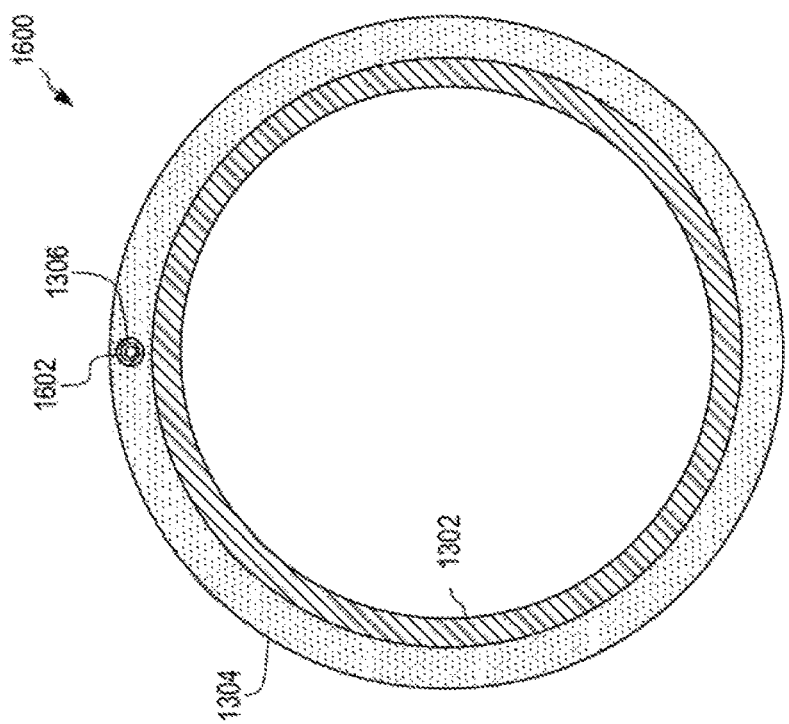
FIG. 16 is an end view illustrating a pipeline segment having a cable positioned within a channel according to certain features of the disclosed subject matter.

FIG. 16 is an end view illustrating a pipeline segment 1600 having a cable 1602 positioned within a conduit 1300 according to certain features of the disclosed subject matter. Insulation material 1304 surrounds the base pipe 1302. A conduit 1306 is embedded in the insulation material 1304. A cable 16602, such as an optical cable, is positioned within the conduit 1306.

In an embodiment, multiple cables can be positioned within a single conduit 1306. In an embodiment, small components can be positioned within a conduit 1306.

FIG. 17 is a side view illustrating two pipeline segments 1702, 1704 having conduits 1708, 1710 before being coupled together according to certain features of the disclosed subject matter. A first pipeline segment 1702 has a first conduit 1708 and a first base pipe 1712. A second pipeline segment 1704 has a second conduit 1710 and a second base pipe 1714. The first pipeline segment 1702 and second pipeline segment 1704 are placed adjacent one another and the first conduit 1708 is aligned with the second conduit 1710. A bridge coupler 1706 is sized to fit the first conduit 1708 and second conduit 1710.

The bridge coupler 1706 can be a length of conduit having an outer diameter slightly larger than the outer diameter of the first conduit 1708 and second conduit 1710.

FIG. 18 is a side view illustrating two pipeline segments 1702, 1704 having conduits 1708, 1710 with a cable 1718 pulled through a bridge coupler 1706 according to certain features of the disclosed subject matter. The first pipeline segment 1702 with the first conduit 1708 and first base pipe 1712 can include a drag line 1720 positioned within the first conduit 1708. The drag line 1720 can be pre-installed in the first conduit 1708 or placed in the first conduit 1708.

The second pipeline segment 1704 with the second conduit 1710 and second base pipe 1714 can include a cable 1718 extending from the second conduit 1710. The cable 1718 can be pre-installed in the second conduit 1710 or previously fed through the second conduit 1710. A cable 1718 can be fed through a conduit by being pushed, such as with an object or with a fluid, such as pumped gas. A plug can be coupled to the cable 1718 to aid in pushing the cable 1718 through the second conduit 1710. The cable 1718 can be pulled through the second conduit 1710, such as by another drag line. The cable 1718 can be pulled through the second conduit 1710 by applying a vacuum to one side of the conduit 1710. Again, a plug can be coupled to the cable 1718 to aid in pulling the cable 1718 through the second conduit 1710 using a vacuum. The cable 1718 can be pulled and pushed through the second conduit 1710 using any combination of techniques, such as those discussed above.

The cable 1718 can be fed through the bridge coupler 1706. The cable 1718 can be coupled to the drag line 1720 and pulled through the first conduit 1708.

FIG. 19 is a side view illustrating two pipeline segments 1702, 1704, having conduits 1708, 1710, being welded together according to certain features of the disclosed subject matter. The first pipeline segment 1702 includes the first conduit 1708 and the first base pipe 1712. The second pipeline segment 1704 includes the second conduit and the second base pipe 1714. The bridge coupler 1706 has been slid over the second conduit. The bridge coupler 1706 can have an inner diameter sufficiently large to allow the bridge coupler 1706 to slide over a conduit. This movement of the bridge coupler 1706 can allow the bridge coupler 1706 to slide over the second conduit, leaving a gap between the end of the bridge coupler 1706 and the first conduit 1708, the gap being suitably sized to allow movement of the cable 1718. The cable 1718 has been pulled through at least a portion of the first conduit 1708. The cable 1718 can be pulled further through the first conduit 1708 so that it is pulled taught as seen in FIG. 20.

The first base pipe 1712 is coupled to the second base pipe 1714. The first base pipe 1712 can be welded to the second base pipe 1714 with a weld 1902. The first base pipe 1712 can be welded to the second base pipe 1714 before the bridge coupler 1706 is placed on the second conduit, allowing the bridge couples 1706 and cable 1718 to be pulled clear of the ends of the first base pipe 1712 and second base pipe 1714 during the welding operation. Once the weld 1902 is complete and sufficiently cooled, the bridge coupler 1706 can be placed over the second conduit and the cable 1718 can be pulled taught.

FIG. 20 is a side view illustrating two pipeline segments 1702, 1704 welded together having a cable 1718 fed through respective conduits 1708, 1710 according to certain features of the disclosed subject matter. The first base pipe 1712 of the first pipeline segment 1702 is welded to the second base pipe 1714 of the second pipeline segment 1704 at a weld 1902. The cable 1718 is pulled taught between the first conduit 1708 and the second conduit, which is covered by the bridge coupler 1706. The bridge coupler 1706 can next be moved to cover portions of both the first conduit 1708 and second conduit, as seen in FIG 21.

Figure 21:
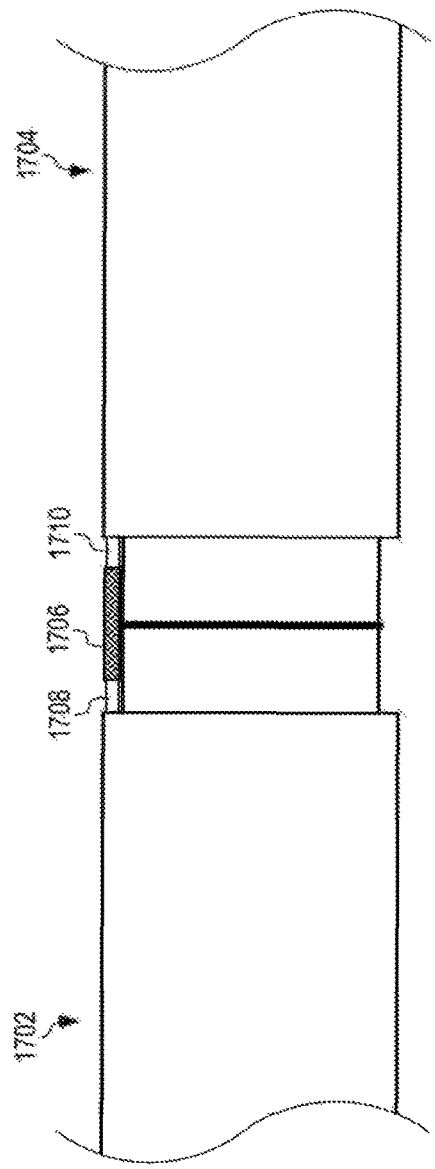
FIG. 21 is a side view illustrating two pipeline segments having conduits joined by a bridge coupler according to certain features of the disclosed subject matter.

FIG. 21 is a side view illustrating two pipeline segments 1702, 1704 having conduits 1708, 1710 joined by a bridge coupler 1706 according to certain features of the disclosed subject matter. The first conduit 1708 of the first pipeline segment 1702 and second conduit 1710 of the second pipeline segment 1704 are coupled with the bridge coupler 1706, forming a single, contiguous conduit.

Figure 22:
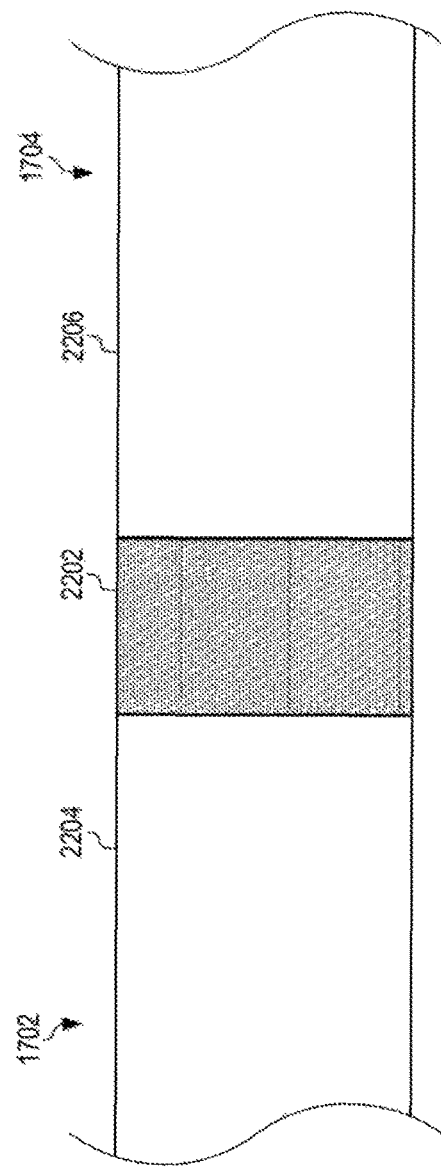
FIG. 22 is a side view illustrating two pipeline segments having supplemental insulation material over the weld and conduits according to certain features of the disclosed subject matter.

FIG. 22 is a side view illustrating two pipeline segments 1702, 1704 having supplemental insulation material 2202 over the weld and conduits according to certain features of the disclosed subject matter. The supplemental insulation material 2202 can be placed over the weld, between the insulation material 2204 of the first pipeline segment 1702 and the insulation material 2206 of the second pipeline segment 1704. The supplemental insulation material 2202, can be smoothed, cut, or otherwise treated to form a smooth, contiguous surface between insulation material 2204 and insulation material 2206.

Figure 23:
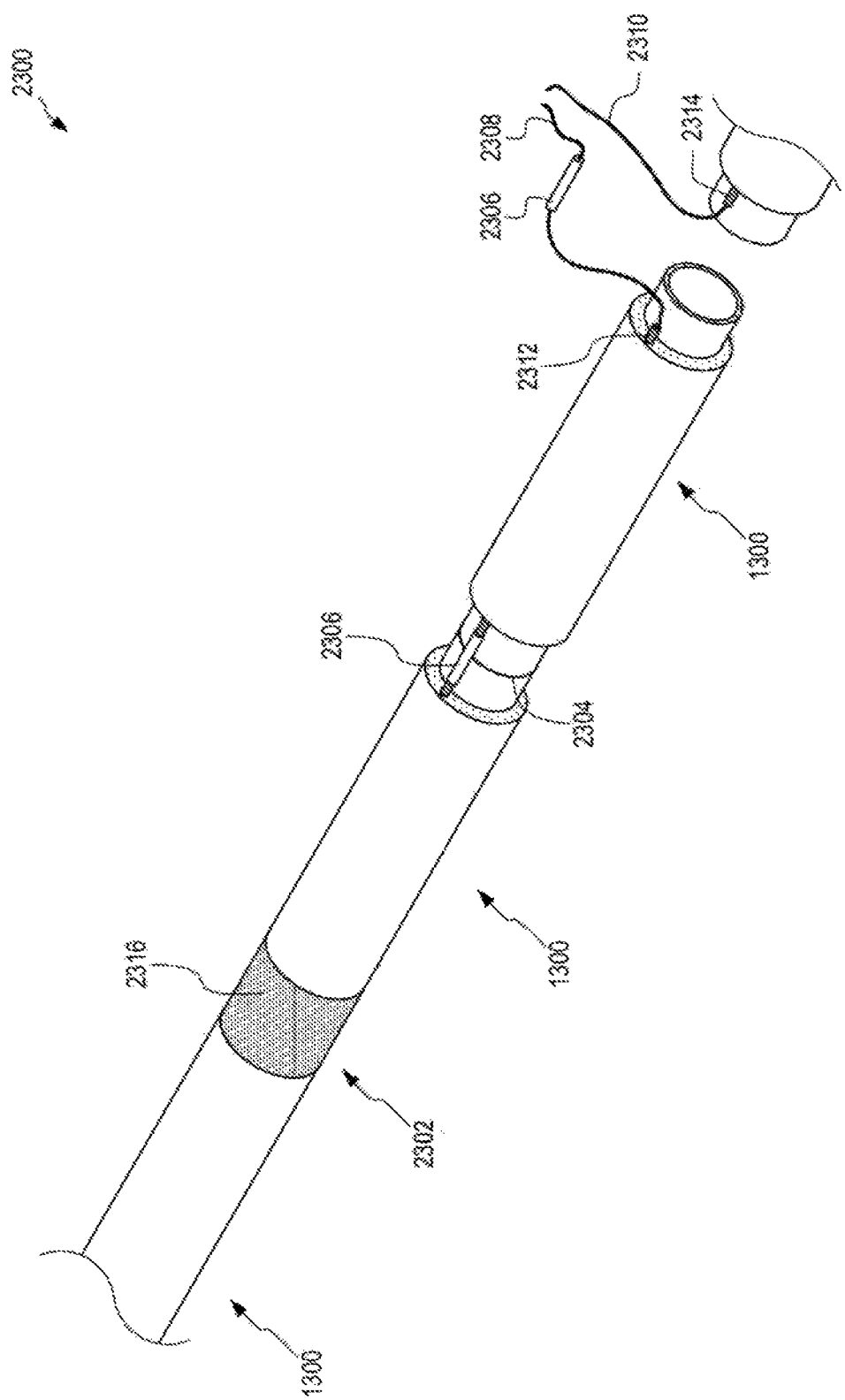
FIG. 23 is an isometric view illustrating a pipeline constructed of multiple pipeline segments with conduits according to certain features of the disclosed subject matter.

FIG. 23 is an isometric view illustrating a pipeline 2300 constructed of multiple pipeline segments 1300 with conduits 2312 according to certain features of the disclosed subject matter. Several pipeline segments 1300 can be coupled together, such as through welding. The end of a base pipe of a first pipeline segment can be welded to an end of a base pipe of a second pipeline segment, resulting in a weld 2304 between the two base pipes. The conduit 2312, 2314 of adjacent pipeline segments may be aligned prior to welding.

In an embodiment, conduit 2312 and conduit 2314 each contain a cable 2308, 2310. The cable 2308 of conduit 2312 can be fed through the bridge coupler 2306. Cable 2308 can be coupled together (e.g., splicing, when the cables are fiber optic cables) to cable 2310. The coupling of cable 2308 and cable 2310 can occur simultaneously as the welding of their respective base pipes if the cables 2308, 2310 are sufficiently long to be pulled out of the way. Once the respective base pipes are welded, the cables 2308, 2310, which are now coupled together, can be pulled taught between the conduits 2312, 2314, and the bridge coupler 2306 can be placed over the conduits 2312, 2314. Supplemental insulation material 2316 can also be placed over the weld 2304, at a welding region 2302, between the insulation materials of adjacent pipeline segments 1300.

Figure 24:
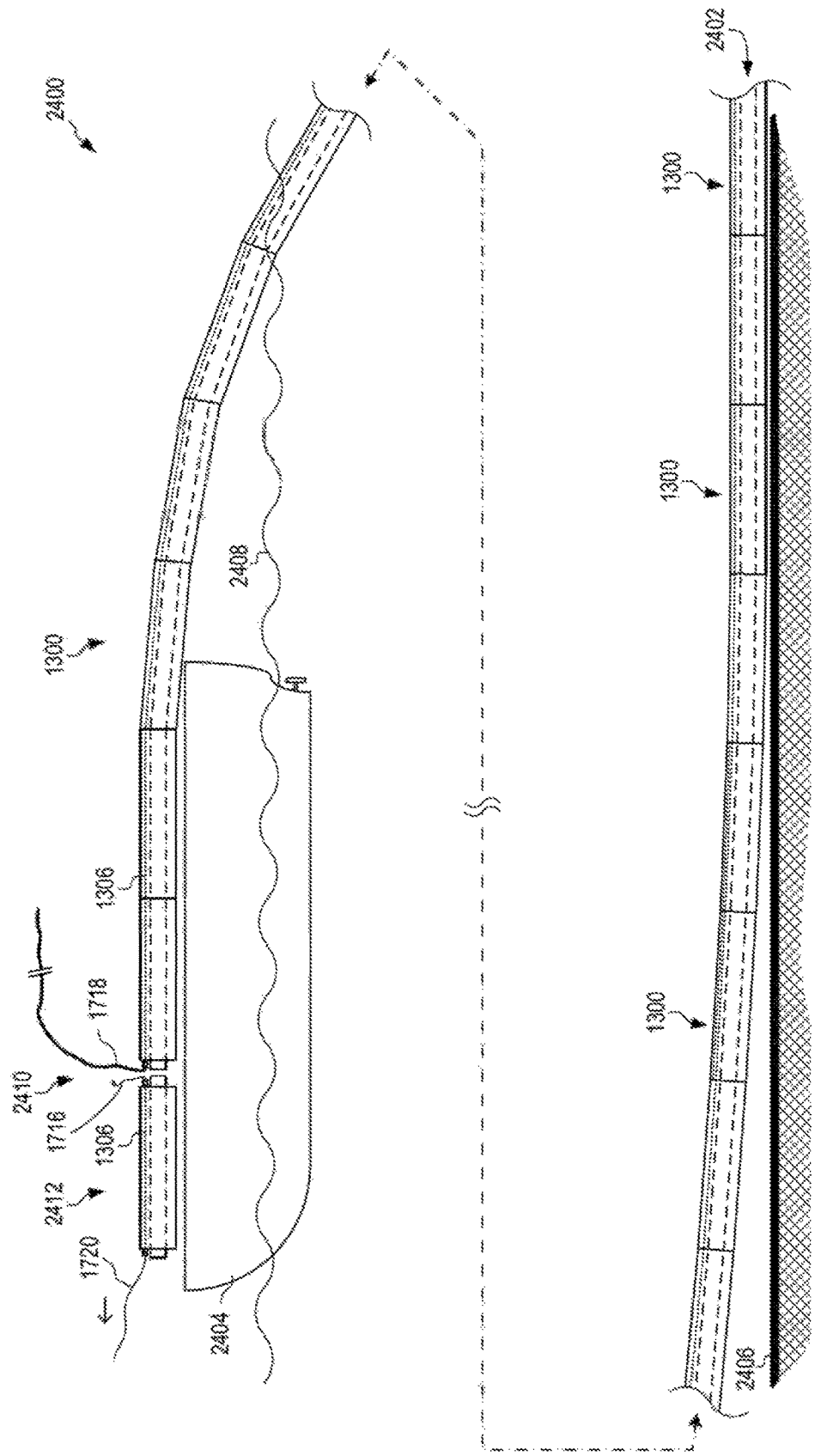
FIG. 24 is an elevation view illustrating a pipelaying vessel installing a pipeline having a cable positioned in conduits according to certain features of the disclosed subject matter.

FIG. 24 is an elevation view illustrating a pipelaying vessel 2404 installing a pipeline 2402 having a cable 1716 positioned in conduits 1306 according to certain features of the disclosed subject matter. On the pipelaying vessel 2404, multiple pipeline segments 1300 can be coupled together as seen in FIG. 23, to form a pipeline 2402. On the pipelaying vessel 2404, a new pipeline segment 2412 having a conduit 1306 can be placed adjacent the existing pipeline 2402 at a welding station 2410. The base pipe of the new pipeline segment 2412 can be welded to the adjacent base pipe of the pipeline segment at the end of the pipeline 2402.

Cable 1716 can be coupled fed through a bridge coupler and then attached to a drag line 1720. Drag line 1720 can be pulled through the conduit of the new pipeline segment 2412 to pull the cable 1716 through the conduit of the new pipeline segment 2412. As disclosed herein, other methods can be used to feed the cable 1716 through the conduit of the new pipeline segment 2412.

The pipelaying vessel 2404 can be floating on a sea 2408 of other water feature. As pipeline segments 1300 are coupled together and pushed off the rear end of the pipelaying vessel 2404, the pipelaying vessel 2404 can be propelled forward. The pipeline segments 1300 can be gradually pulled towards the seabed 2406 by gravity. Eventually, when the pipeline 2402 is sufficiently long, the pipeline 2402 can rest on the seabed 2406.

A subsea pipeline 2402 having a cable 1716 positioned within a conduit 1306 that is embedded in the insulation material of the pipeline 2402 can thus be created and installed. The disclosed process for creating and installing the pipeline 2402 can occur, with slight variation, on land. As disclosed, above, any combination, of cables and drag lines can be fed into or pre-installed in the conduits of the pipeline segments 1300.

As described above with reference to FIGS. 13-24, any type of waveguide can be positioned within a conduit (e.g., conduit 1306) instead of or in addition to a cable (e.g., cable 1718). Waveguides can be optical waveguides (e.g., optical cables) or other suitable waveguides, as described above. Additionally, the conduit (e.g., conduit 1306) can act as a waveguide itself if it is sufficiently structured. For example, conduit 1306 can be a nitrogen-purged pipe made of steel clad copper capable of propagating signals from a first end of the pipeline 2402 to the second end of the pipeline 2402 in the terahertz regime. Such a conduit 1306 can be considered a waveguide. Such a conduit 1306 can further include a cable 1718 within the inner diameter of the conduit 1306.

FIG. 25 is an isometric view illustrating a pipeline segment 2500 having a cable 2506 embedded in insulation material 2504 according to certain features of the disclosed subject matter. Pipeline segment 2500 includes a base pipe 2502 having a first end 2514 and a second end 2520. The base pipe 2502 has a longitudinal axis 2524 extending parallel to the length of the base pipe 2502. The base pipe includes a first non-insulated end region 2510 and a second non-insulated end region 2512 separated by an insulated region 2508. The insulated region includes insulation material 2504 coupled to or otherwise coating the base pipe 2502. The insulation material 2504 has a first end 2516 and a second end 2518.

A cable 2506 is embedded in the insulation material 2504. The cable 2506 can be embedded in the insulation material 2504 during installation of the insulation material 2504 on the base pipe 2502. The cable 2506 can be inserted into the insulation material 2504 after excavating a suitable hole in the insulation material 2504, after the insulation material 2504 has already been installed on the base pipe 2502. The cable 2506 can extend entirely through the length of the insulated region 2508, transitioning into and out of the insulated region 2508 at either the insulation material's first end 2516 or second end 2518. The cable 2506 can be sufficiently long to allow for long "pigtails" extending from the insulation material 2504. The pigtails can be sufficiently long to facilitate easy splicing to a cable of an adjacent pipeline segment 3500. In an embodiment, the pigtails can be sufficiently long to allo2 splicing of the cable to be performed at a suitable distance from the welding that occurs between the first end 2514 and second end 2520 of adjacent base pipes 2502. The cable 2506 can be located at any suitable depth within the insulation material 2504, such as adjacent the surface 2526 of the insulation material 2504, adjacent the base pipe 2502, or anywhere in between.

In an embodiment, a component 2522 is optionally embedded in the insulation material 2504. The component 2522 can be an amplifier, a repeater, or other suitable component. The component 2522 can tie embedded at any suitable depth. The component 2522 can be operatively coupled in-line with the cable 2506. For example, in the case of an optical repeater, the cable 2506 can comprise a first cable that enters the insulation material 2504 from the first end 2516 and terminates at the component 2522, and a second cable that exits the component 2522 and then exits the insulation material 2504 from the second end 2518. In some embodiments, the cable 2506 can be a single cable that extends through the insulation material 2504 without any breaks or terminations. In some embodiments, a component 2522 can be a non-contacting component that fits around the cable 2506. In an embodiment, the component 2522 can be located adjacent and breaking through the first end 2516 or second end 2518 of the insulation material 2504 so that it can be more easily accessed. The component 2522 can be embedded in the insulation material 2504 during installation of the insulation material 2504 to the base pipe 2502. The component 2522 can be inserted into the insulation material 2504 after a suitable recess has been carved out of the insulation material 2504. The insulation material 2504 can include multiple components 2522.

One or more cables 2506 can be embedded in the insulation material 2504. A cable 2506 can extend in a direction parallel to the longitudinal axis 2524 of the base pipe 2502. A cable can follow a path that is not parallel to the longitudinal axis 2524 of the base pipe 2502, such as a spiral path or a zigzag path.

Figure 26:
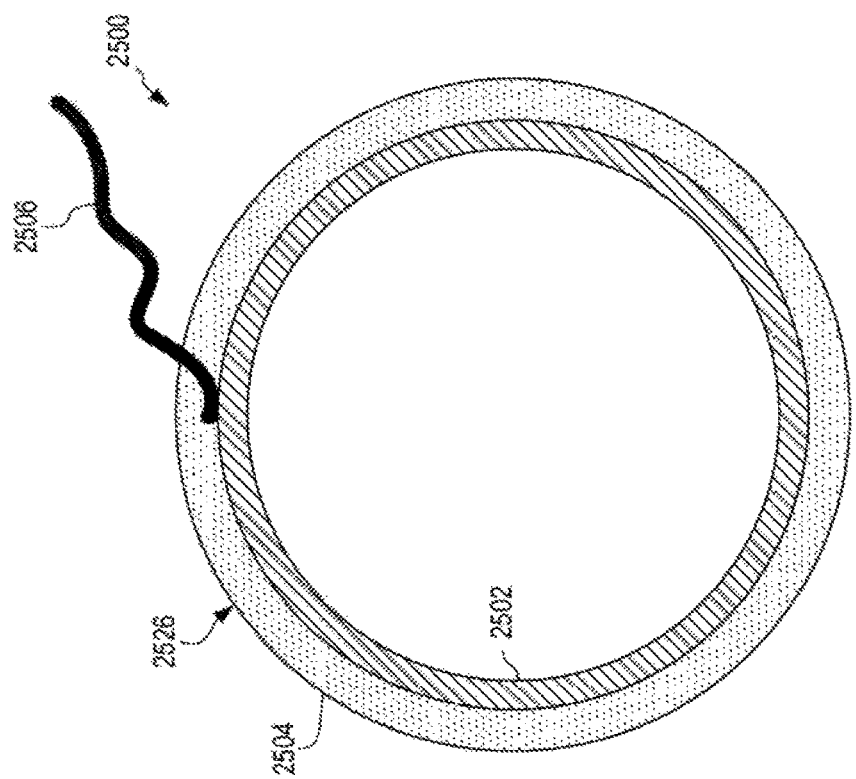
FIG. 26 is an end view illustrating the pipeline segment of FIG. 25 according to certain features of the disclosed subject matter.

FIG. 26 is an end view illustrating the pipeline segment 2500 of FIG. 25 according to certain features of the disclosed subject matter. Insulation material 2504 surrounds the base pipe 2502. A cable 2506 is embedded in the insulation material 2504, under the surface 2526 of the insulation material 2504. Cable 2506 can be any suitable cable, such as an optical cable or an electrical cable. The cable 2506 can be of any suitable size (e.g., diameter) for being embedded in the insulation material 2504 without extending past the surface 2526 of the insulation material 2504. A pipeline segment 2500 can include cables spaced at any suitable angular spacing around the insulation material 2504.

The cable 2506 can be positioned to be contacting the base pipe 2502.

Figure 27:
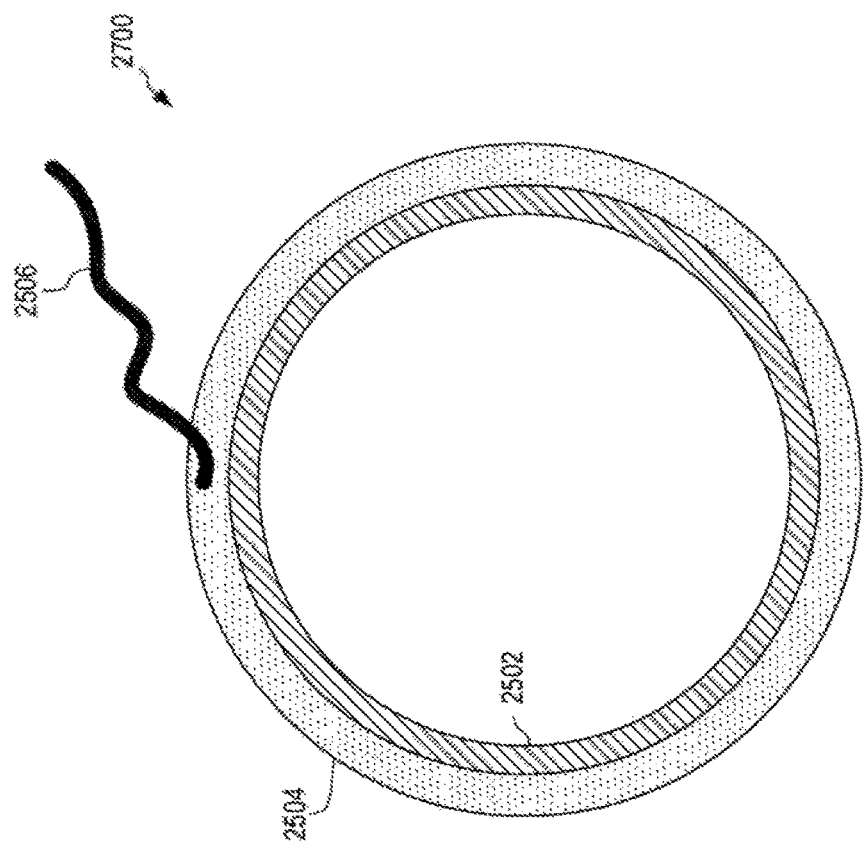
FIG. 27 is an end view illustrating a pipeline segment having a cable embedded in insulation material spaced apart from a base pipe according to certain features of the disclosed subject matter.

FIG. 27 is an end stew illustrating a pipeline segment 2700 having a cable 2500 embedded in insulation material 2504 spaced apart from a base pipe 2502 according to certain features of the disclosed subject matter. The cable 2500 can be positioned in the insulation material 2504 at a distance spaced apart from the base pipe 2502. In an embodiment, the cable 2506 can be positioned sufficiently far from the base pipe 2502 to facilitate welding the base pipes 2502 of adjacent pipeline segments 2700 together without providing too much heat to the cable 2506. In an embodiment, the cable 2506 can be positioned, sufficiently far from the base pipe 2502 to additionally insulate the cable 2506 from the base pipe 2502 against unwanted signal transfer, such as via electrical, electromagnetic, or magnetic signals.

FIG. 28 is a side view illustrating two pipeline segments 2802, 2804 having cables 2806, 2808 stoted so cable protectors 2810, 2812 according to certain features of the disclosed subject matter. A first pipeline segment 2802 has a first cable 2800 and a first base pipe 2814. A second pipeline segment 2804 has a second cable 2808 and a second base pipe 2816.

A first cable protector 2810 can contain and secure the end of the first cable 2806. A second cable protector 2812 can contain and secure the end of the second cable 2808. Cable protectors 2810, 2812 can provide protection to their respective cables 2806, 2808, as well as provide a way to manage the cables 2806, 2808 during transit and storage of the pipeline segments 2802, 2804. In an embodiment, the cable protectors 2810, 2812 can also be used to protect the ends of the base pipes 2814, 2816. In an embodiment, the cable protectors 2810, 2812 can also be used to protect the inner diameters of the base pipes 2814, 2816. In an embodiment, the cable protectors 2810, 2812 can removably attach to the ends of the base pipes 2814, 2816. In an embodiment, the cable protectors 2810, 2812 can removably attach to the non-insulated regions of the base pipes 2814, 2816. Cable protectors 2810, 2812 can attach elsewhere to the pipeline segments 2802, 2804, or may attach only to the cables 2806, 2808.

During installation, the first pipeline segment 2802 and second pipeline segment 2804 can be placed adjacent one another. Optionally, the first cable 2806 can be aligned with the second cable 2808. The cable protectors 2810, 2812 can be removed. In an embodiment, the cable protectors 2810, 2812 can provide visual or tactile elements that aid in aligning the pipeline segments 2802, 2804.

Figure 29:
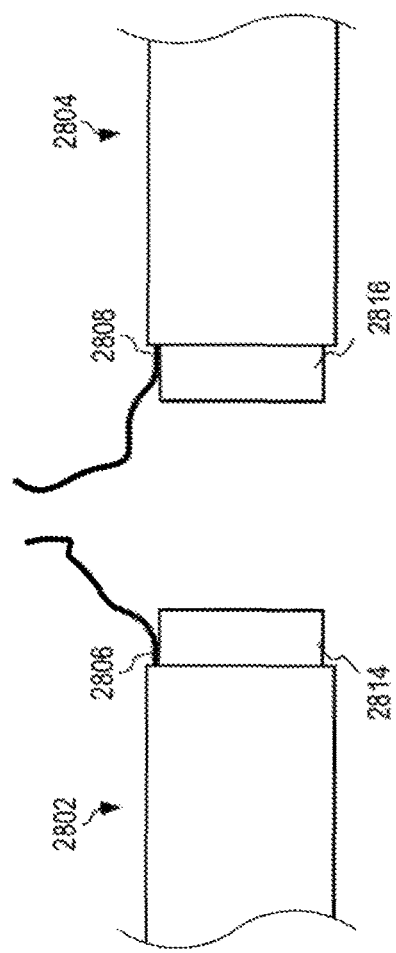
FIG. 29 is a side view illustrating two pipeline segments having cables before being coupled together according to certain features of the disclosed subject matter.

FIG. 29 is a side view illustrating two pipeline segments 2802, 2804 having cables 2806, 2808 before being coupled together according to certain features of the disclosed subject matter. The first base pipe 2814 of the first pipeline segment 2802 placed adjacent the second base pipe 2816 of the second pipeline segment 2804. The cables 2806, 2808 can be spread out and away from the base pipes 2814, 2816 to facilitate welding together of the base pipes 2814, 2816.

Figure 30:
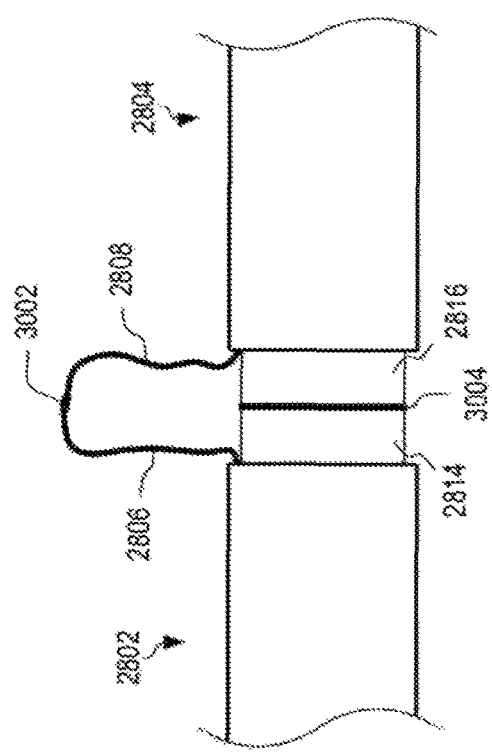
FIG. 30 is a side view illustrating two pipeline segments having cables welded together according to certain features of the disclosed subject matter.

FIG. 30 is a side view illustrating two pipeline segments 2802, 2804, having cables 2806, 2808, welded together according to certain features of the disclosed subject matter. The base pipes 2814, 2816 of pipeline segments 2802, 2804 are welded together at weld 3004. Before, after, or during the welding together of the base pipes 2814, 2816, the first cable 2806 can be coupled to the second cable 2808. In cables 2806, 2808 can be coupled using any suitable coupling technique and any required couplers 3002 depending on the type of cables used. For example, cables 2806, 2808 can be optical cables that are coupled together by spiking (e.g., fusion splicing or mechanical splicing). In an embodiment, no coupler 3002 is used.

If coupling of the cables 2806, 2808 is to occur substantially simultaneously or simultaneously with welding of the base pipes 2814, 2816, the cables 2806, 2808 can be pulled away from the base pipes 2814, 2816, such as in the "U" shape seen in FIG. 30.

FIG. 31 is a side view illustrating two pipeline segments 2802, 2804 welded together having cables 2806, 2808 wrapped around the weld 3004 according to certain features of the disclosed subject matter. The cables 2806, 2808 can be wrapped around the weld 3004 for convenience or protection. The cables 2806, 2808 can be wrapped around the weld 3004 once the weld 3004 has sufficiently cooled. Wrapping the cables 2806, 2808 around the weld 3004 further allows the cables 2806, 2808 to have sufficiently long spans of cable outside the insulation material of the pipeline segments 2802, 2804, which can facilitate coupling of the cables 2806, 2808. The cables 2806, 2808 can be wrapped around the weld 3004 in any convenient manner, including wrapping around as seen in FIG. 31, bunching up the cables around the base pipes 2814, 2816 or otherwise.

FIG. 32 is a side view illustrating two pipeline segments 2802, 2804 having supplemental insulation material 3202 over the weld 3004 according to certain features of the disclosed subject matter. The supplemental insulation material 3202 can be placed over the weld, between the insulation material 3204 of the first pipeline segment 2802 and the insulation material 3206 of the second pipeline segment 2804. The supplemental insulation material 3202, can be smoothed, cut, or otherwise treated to form a smooth, contiguous surface between insulation material 3204 and insulation material 3206.

Figure 33:
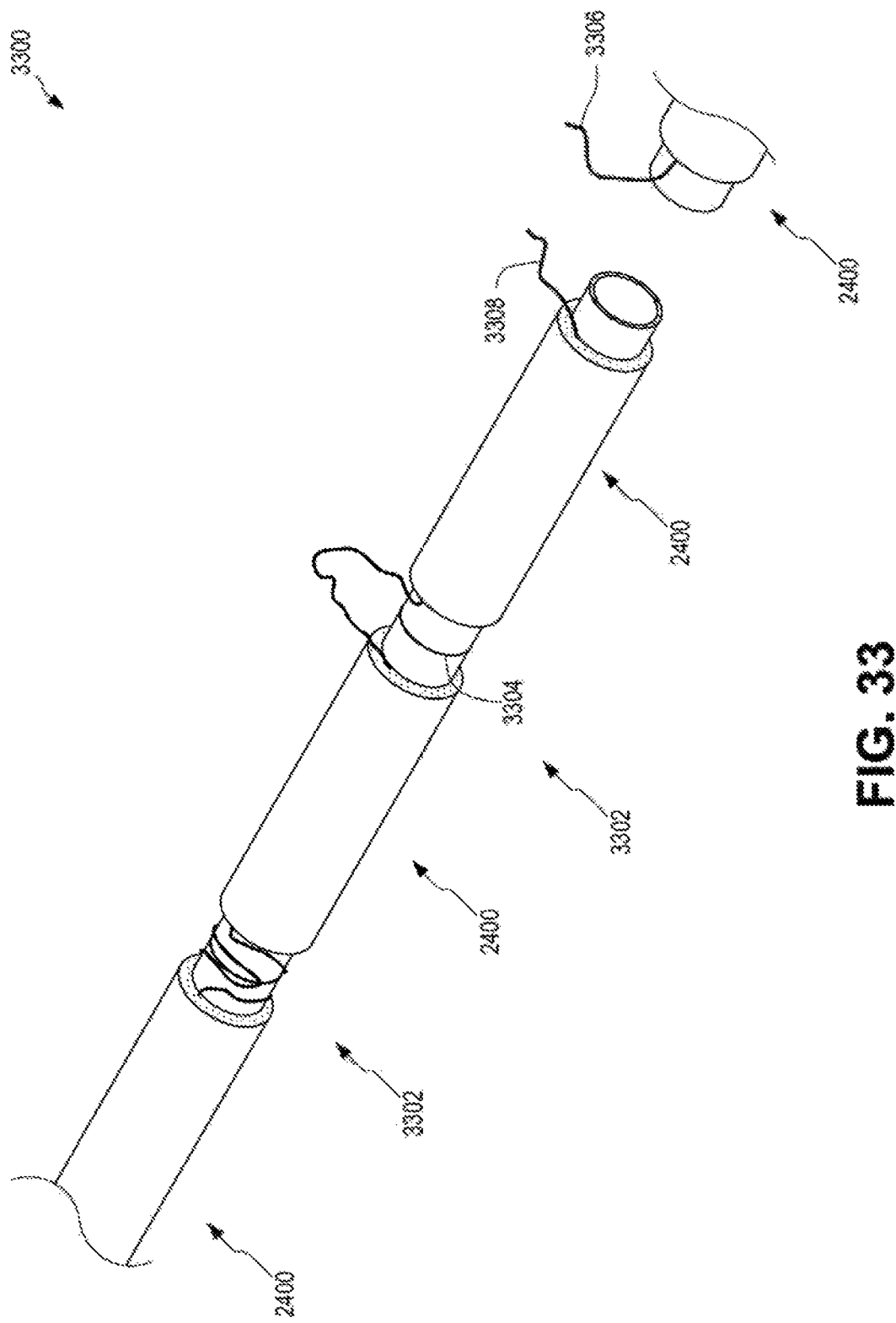
FIG. 33 is an isometric view illustrating a pipeline constructed of multiple pipeline segments with embedded cables according to certain features of the disclosed subject matter.

FIG. 33 is an isometric view illustrating a pipeline 3300 constructed of multiple pipeline segments 2400 with embedded cables 3306, 3308 according to certain features of the disclosed subject matter. Several pipeline segments 2400 can be coupled together, such as through welding. The end of a base pipe of a first pipeline segment can be welded to an end of a base pipe of a second pipeline segment, resulting in a weld 3304 between the two base pipes. The cables 3306, 3308 of adjacent pipeline segments 2400 may be aligned prior to welding.

Cables 3306, 3308 of adjacent pipeline segments 2406 can be coupled together (e.g., by splicing). The coupling of cable 306 and cable 3308 can occur simultaneously as the welding of their respective base pipes if the cables 3306, 3308 are sufficiently long to be pulled out of the way. Once the respective base pipes are welded, the cables 3306, 3308, which are now coupled together, can be pulled wrapped atound the base pipes of the adjacent pipeline segments 2400. Supplemental insulation material can be placed over the weld 3304, at a welding region 3302, between the insulation materials of adjacent pipeline segments 2400.

Figure 34:
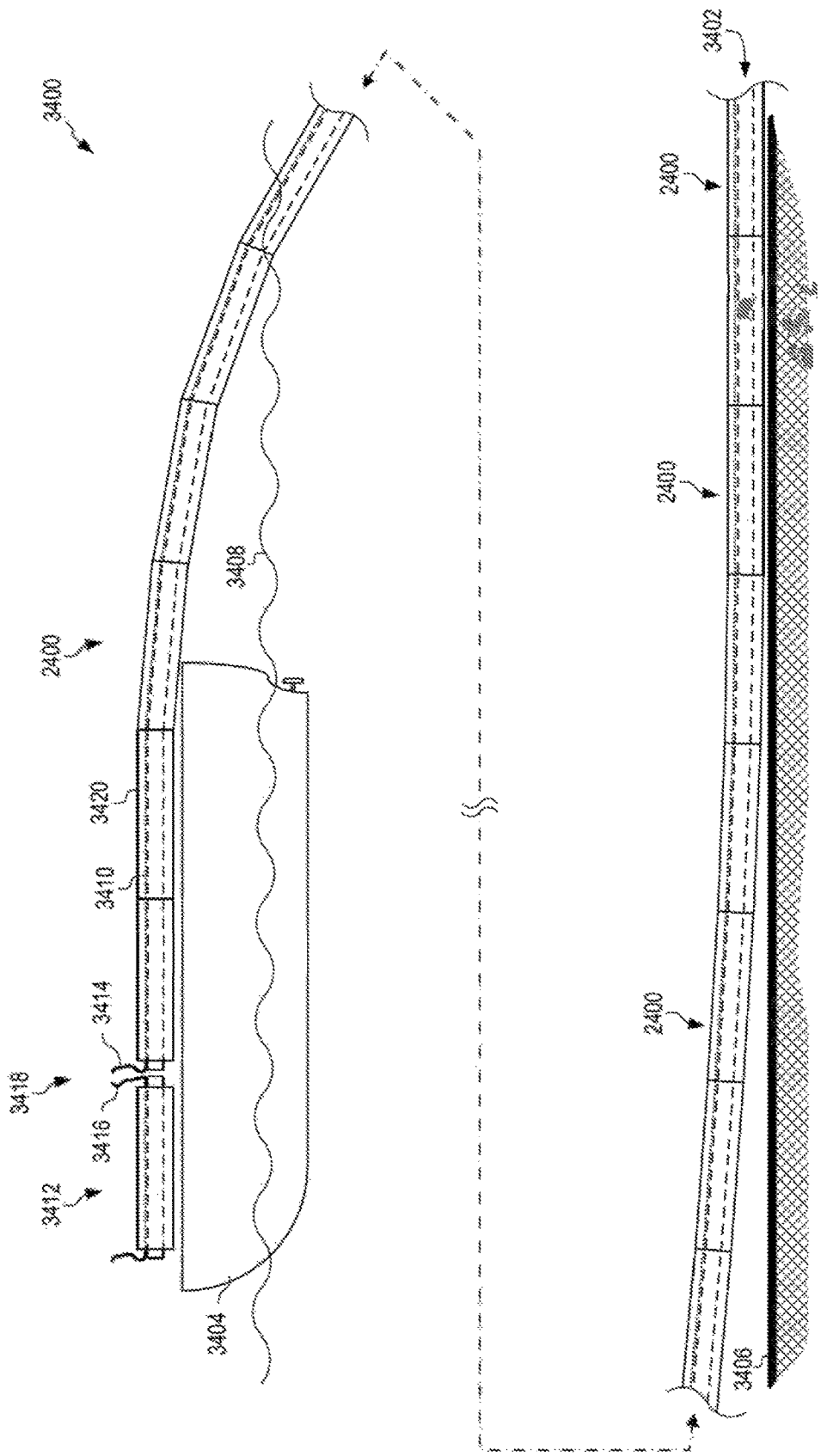
FIG. 34 is an elevation view illustrating a pipelaying vessel installing a pipeline having cables embedded in insulation material according to certain features of the disclosed subject matter.

FIG. 34 is an elevation view illustrating a pipelaying vessel 3404 installing a pipeline 3402 having cables 3414, 3410 embedded in insulation material 3420 according to certain features of the disclosed subject matter. On the pipelaying vessel 3404, multiple pipeline segments 2400 can be coupled together, as seen in FIG. 33, to form a pipeline 3402. On the pipelaying vessel 3404, a new pipeline segment 3412 having a cable 3416 can be placed adjacent the existing pipeline 3402 at a welding station 3418. The base pipe of the new pipeline segment 3412 can be welded to the adjacent base pipe of the pipeline segment at the end of the pipeline 3402.

A cable 3414 from the pipeline segment at the end of the pipeline 3402 can be coupled to the cable 3416 of the new pipeline segment 3412. Each cable in each pipeline segment, when coupled together, for cable 3410 embedded in the insulation material 3420 of the pipeline 3402.

The pipelaying vessel 3404 can be floating on a sea 3408 or other water feature. As pipeline segments 2400 are coupled together and pushed off the rear-end of the pipelaying vessel 3404, the pipelaying vessel 3404 can be propelled forward. The pipeline segments 2400 can be gradually pulled towards the seabed 3406 by gravity. Eventually, when die pipeline 3402 is sufficiently long, the pipeline 34o2 can rest on the seabed 3406.

A subsea pipeline 3402 having a cable 3410 positioned within the insulation material 3420 of the pipeline 3402 can thus be created and installed. The disclosed process for creating and installing the pipeline 5402 can occur, with slight variation, on land.

As described above with reference to FIGS. 25-34, any type of waveguide can be embedded within the insulation material (e.g., insulation material 3420) instead of or in addition to a cable (e.g., cable 3414).

In an embodiment, a pipeline can be created using any combination of the aforementioned techniques. For example, a pipeline can be created that combines pipeline segments having cables positioned in channels (e.g., as seen in FIGS. 8-9) and pipeline segments having cables positioned in conduits (e.g., as seen in FIGS. 23-24) or pipeline segments having cables embedded in the insulation material of the pipeline (e.g., as seen in FIGS. 33-34). Any other combination of pipeline segments can be used to create a pipeline having a cable positioned within the insulation material (e.g., within a channel, within a conduit, or directly within the insulation material) of the pipeline.

Figure 35:
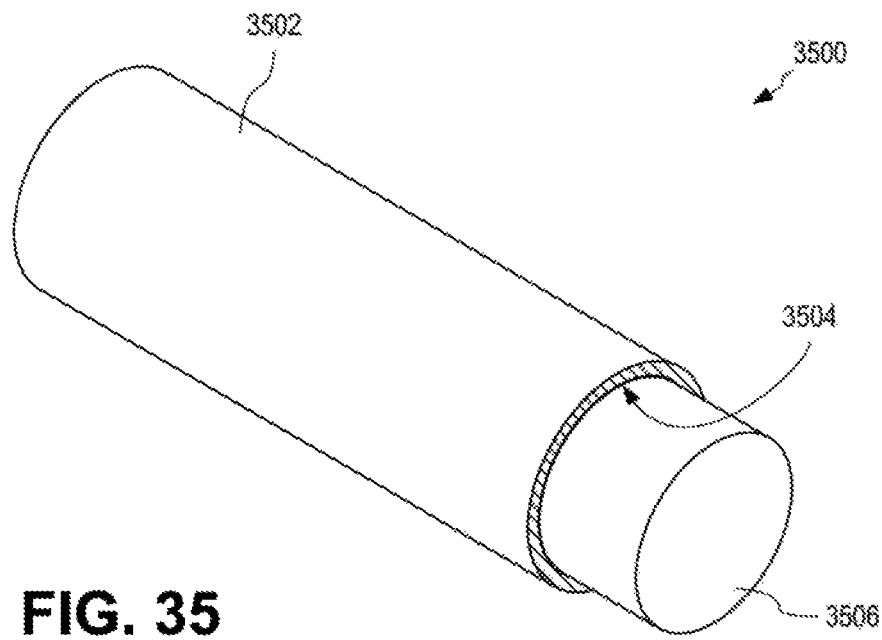
FIG. 35 is a partial-cutaway isometric view of a waveguide having a filling according to certain features of the disclosed subject matter.

FIG. 35 is a partial-cutaway isometric view of a waveguide 3500 having a filling 3506 according to certain features of the disclosed subject matter. The waveguide 3500 can be any suitable waveguide, as described above with reference to FIGS. 2-34. The waveguide can be a waveguide pipe. The waveguide can include a shell 3502 made of an electrically conductive material, such as steel clad copper. The shell 3502 (shown partially removed in FIG. 35) can include an inner diameter 3504. The waveguide can include a filling 3506. The filling 3506 can fill the inner diameter 3504 of the shell 3502. The filling 3506 can be a dielectric material. The filling 3506 can be a transparent, dielectric material. In an embodiment not shown, the filling 3506 can further include a cable embedded therein.

Figure 36:
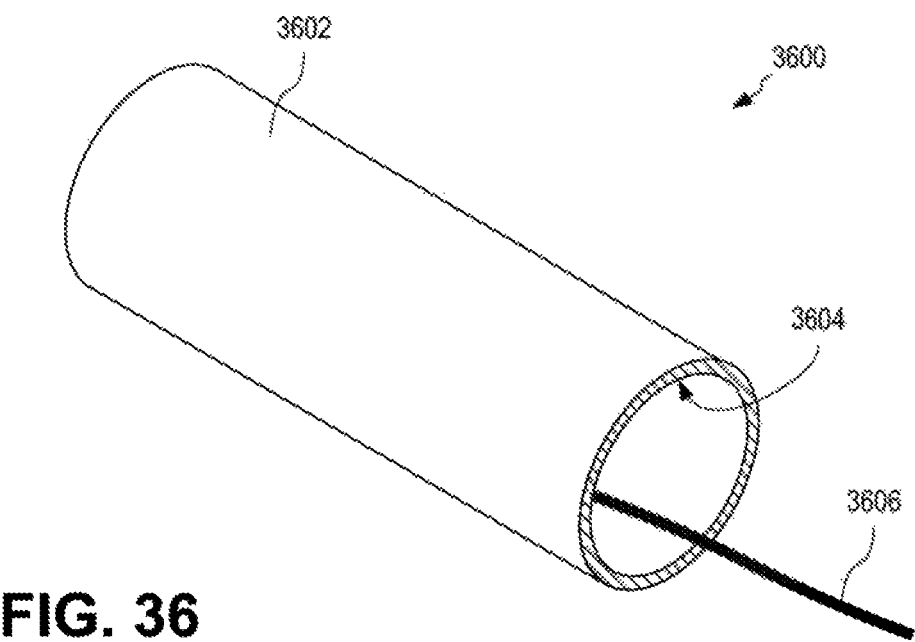
FIG. 36 is a partial-cutaway isometric view of a waveguide including a cable according to certain features of the disclosed subject matter.

FIG. 36 is a partial-cutaway isometric view of a waveguide 3600 including a cable 3606 according to certain features of the disclosed subject matter. The waveguide 3600 can be any suitable waveguide, as described above with reference to FIGS. 2-34. The waveguide can be a waveguide pipe. The waveguide can include a shell 3602 made of an electrically conductive material, such as steel clad copper. The shell 3602 (shown partially removed in FIG. 36) can include an inner diameter 3604. The waveguide can include inert gas filling the inner diameter 3604 of the shell 3602. The inert gas can be nitrogen. The waveguide can include a cable 3606 positioned within the inner diameter 3604 of the shell 3602. The cable 3606 can be any suitable cable. The cable 3606 can be an optical cable. The waveguide 3600 can be capable of carrying signals in the terahertz regime through the waveguide (e.g., via the shell 3602) while simultaneously carrying signals through the cable 3606 (e.g., optical signals through an optical cable).

The foregoing description of the embodiments, including illustrated embodiments, has been presented only for the purpose of illustration and description and is not intended to be exhaustive or limiting to the precise forms disclosed. Numerous modifications, adaptations, and uses thereof will be apparent to those skilled in the art.

As used below, any reference to a series of examples is to be understood as a reference to each of those examples disjunctively (e.g., "Examples 1-4" is to be understood as "Examples 1, 2, 3, or 4").

Example 1 is a tubular comprising a base pipe for transporting hydrocarbons, insulation material exterior to and coupled to the base pipe, and a channel in the insulation material, the channel being sized for receiving a fiber optic cable.

Example 2 is the tubular of example 1 also comprising a second channel in the insulation material, the second channel being sized for receiving the fiber optic cable.

Example 3 is the tubular of examples 1 or 2 wherein the channel extends from a surface of the insulation material to the base pipe.

Example 4 is the tubular of examples 1-3 wherein the channel includes a lip formed by the insulation material.

Example 5 is the tubular of examples 1-4 wherein the channel extends from a first end of the insulation material to a second end of the insulation material in a line parallel with a longitudinal axis of the base pipe.

Example 6 is the tubular of examples 1-5 wherein the channel is a groove formed in a surface of the insulation material.

Example 7 is the tubular of examples 1-6 further comprising a recess in the insulation material, wherein the recess is sized for receiving a component, and wherein the recess intersects the channel.

Example 8 is an assembly comprising the tubular of examples 1-7; a second tabular, the second tubular having a second base pipe; additional insulation material exterior to and coupled to the second base pipe; and a second channel in the additional insulation material, the second channel being sized for receiving the fiber optic cable, wherein the base pipe and the second base pipe are coupled together, and wherein the fiber optic cable is positioned within the channel and the second channel; and supplemental insulation material deposited within the channel and the second channel, wherein the supplemental insulation material secures the fiber optic cable within each of the channel and the second channel.

Example 9 is a tubular comprising a base pipe having a pipe length; insulation material exterior to mid coupled to the base pipe, the insulation material including an outer surface, a first end, and a second end, the insulation material having an insulation length that is smaller than the pipe length; and a channel in the insulation material extending from the first end to the second end, the channel having a wall formed in the outer surface of the insulation material.

Example 10 is the tubular of example 9, also comprising a second channel in the insulation material extending from the first end to the second end, wherein the second channel is a groove formed in the outer surface of the insulation material and wherein the second channel does not intersect the channel.

Example 11 is the tubular of examples 9 or 10 wherein the channel extends to the base pipe.

Example 12 is the tubular of examples 9-11 wherein the channel includes a lip formed by the insulation material.

Example 13 is the tubular of examples 9-12 wherein the channel extends in a line parallel with a longitudinal axis of the base pipe.

Example 14 is the tubular of examples 9-13 wherein the channel is a groove formed in a surface of the insulation material.

Example 15 is the tubular of examples 9-14 further comprising a recess in the insulation material, wherein the recess is sized for receiving a component, wherein the recess is formed in a surface of the insulation material, and wherein the recess intersects the channel.

Example 16 an assembly comprising the tubular of examples 9-15; a second tubular, the second tubular having a second base pipe having a second pipe length; additional insulation material exterior to and coupled to the second base pipe, the additional insulation material including an additional outer surface, an additional first end, and an additional second end, the additional insulation material having an additional insulation length that is smaller than the second pipe length; and a second channel in the additional insulation material extending from the additional first end to the additional second end, the second channel having a second wall formed in the additional outer surface of the additional insulation material, wherein the base pipe and the second base pipe are coupled together; a fiber optic cable positioned within the channel and the second channel; and supplemental insulation material deposited within the channel and the second channel, wherein the supplemental insulation material secures the fiber optic cable within each of the channel and the second channel.

Example 17 is an assembly comprising a plurality of base pipes coupled together, each base pipe of the plurality of base pipes including a segment of insulation material exterior to and coupled to the base pipe and each segment of insulation material including a first end, a second end, and a channel extending between the first end and the second end; a cable, the cable being positioned within each of the channels; and supplemental insulation material deposited within each of the channels, wherein the supplemental insulation material secures the cable within each of the channels.

Example 18 is the assembly of example 17 where the base pipes of the plurality of base pipes are welded together and wherein the cable is an optical cable.

Example 19 is the assembly of examples 17 or 18 wherein for each of the plurality of base pipes, the channel includes a wall that is contiguous with a longitudinal surface of the segment of insulation material.

Example 20 is the assembly of examples 17-19 wherein, for at least one of the plurality of base pipes, the segment of insulation material further includes a recess formed in a surface of the segment of insulation material.

Example 21 is a tubular, comprising a base pipe for transporting hydrocarbons; insulation material exterior to and coupled to the base pipe; and a conduit positioned within the insulation material and extending through an entire length of the insulation material.

Example 22 is the tabular of example 21 further comprising a drag hue positioned within the conduit, wherein the drag line is translatable with respect to the conduit for pulling a cable through the conduit.

Example 23 is the tubular of examples 21 or 22 further comprising an optical cable positioned within the conduit, wherein the optical cable includes a first end extending past a conduit first end and a second end extending past a conduit second end.

Example 24 is the tubular of examples 21-23 wherein the conduit is electrically conductive, and wherein the conduit is electrically insulated from the base pipe.

Example 25 is the tubular of example 21-24 further comprising a recess in the insulation material, wherein the recess is sized for receiving a component, wherein the recess intersects the conduit.

Example 26 is the tubular of examples 21-25 wherein the conduit has a first conduit end and a second conduit end, and wherein the first conduit end extends beyond a first insulation end and the second conduit end extends beyond a second insulation end.

Example 27 is an assembly comprising the tubular of examples 31-26 and a second tubular having a second base pipe; additional insulation material exterior to and coupled to the second base pipe; and a second conduit positioned within the additional insulation material and extending through an additional entire length of the additional insulation material, wherein the base pipe is coupled to the second base pipe.

Example 28 is a tubular comprising a base pipe having a base pipe first end and a base pipe second end; insulation material exterior to and coupled to the base pipe, the insulation material having an insulation first end and an insulation second end; and a conduit positioned within the insulation material, the conduit having a conduit first end and a conduit second end, the conduit first end positioned between the base pipe first end and the insulation first end, and the conduit second end positioned between the base pipe second end and the insulation second end.

Example 29 is the tubular of examples 28 further comprising a drag line positioned within the conduit, wherein the drag line translatable with respect to the conduit for pulling a cable through the conduit.

Example 30 is the tubular of examples 28 or 29 further comprising an optical cable positioned within the conduit wherein the optical cable includes a cable first end extending past the conduit first end and a cable second end extending past the conduit second end.

Example 31 is the tubular of example further comprising a first cable protector and a second cable protector, wherein the first cable protector is positioned proximate the base pipe first end and is shaped to accept and protect the cable first end, and wherein the second cable protector is positioned proximate the base pipe second end and is shaped to accept and protect the cable second end.

Example 32 is the tubular of examples 28-31 wherein the conduit is electrically conductive, and wherein the conduit is electrically insulated from the base pipe.

Example 33 is the tubular of examples 28-32 further comprising a recess in the insulation material, wherein the recess is sized for receiving a component, wherein the recess intersects the conduit proximate the insulation first end or the insulation second end.

Example 34 is an assembly comprising the tubular of examples 28-33; a second tubular having a second base pipe having a second base pipe first end and a second base pipe second end; additional insulation material exterior to and coupled to the second base pipe, the additional insulation material having an additional insulation first end and an additional insulation second end; and a second conduit positioned within the additional insulation material, the second conduit having a second conduit first end and a second conduit second end, the second conduit first end positioned between the second base pipe firt end and the additional insulation first end, the second conduit second end positioned between the second base pipe second end and the additional insulation second end, wherein the base pipe and the second base pipe are coupled together.

Example 35 is an assembly comprising a first base pipe including a first insulated middle region, surrounded by first non-insulated end regions, wherein the first insulated middle region includes first insulation material exterior to and coupled to the first base pipe; a second base pipe coupled to the first base pipe, wherein the second base pipe includes a second insulated middle region surrounded by second non-insulated end regions, wherein the second insulated middle region includes second insulation material exterior to and coupled to the second base pipe; a first conduit positioned within the first insulation material and extending between the first non-insulated end regions and through the first insulated middle region; and a second conduit positioned within the second insulation material and extending between the second non-insulated end regions and through the second insulated middle region.

Example 36 is the assembly of example 35 wherein the first conduit and the second conduit are collinear.

Example 37 is the assembly of examples 35 or 36 further comprising an optical cable positioned within the first conduit and the second conduit.

Example 38 is the assembly of examples 35-37 wherein each of the first conduit and the second conduit is electrically conductive.

Example 39 is the assembly of examples 35-38 further comprising a recess in the first insulation material, wherein the recess is sized for receiving a component, wherein the recess intersects the first conduit proximate one of the first non-insulated end regions.

Example 40 is the assembly of examples 35-39 further comprising a bridge piece coupling the first conduit to the second conduit.

Example 41 is a tubular comprising a base pipe for transporting hydrocarbons; insulation material exterior to and coupled to the base pipe; and an optical cable positioned within the insulation material and contacting the base pipe, the optical cable extending through an entire length of the insulation material.

Example 42 is the tubular of example 41 wherein the optical cable extends through the entire length of the insulation material in a path parallel a longitudinal axis of the base pipe.

Example 43 is the tubular of examples 41 or 42 further comprising a second optical cable positioned within the insulation material and contacting the base pipe, wherein the second optical cable extends through the entire length of the insulation material.

Example 44 is the tubular of examples 41-43 further comprising a component coupled to the optical cable, wherein the component is positioned within the insulation material.

Example 45 is an assembly comprising the tubular of examples 41-44; a second tubular having a second base pipe; additional insulation material exterior to and coupled to the second base pipe; and a second optical cable positioned within the additional insulation material and contacting the second base pipe, the second optical cable extending through an additional entire length of the additional insulation material, wherein the base pipe is coupled to the second base pipe, and wherein the optical cable is optically coupled to the second optical cable.

Example 46 is a tubular comprising a base pipe including an insulated middle region surrounded by a first non-insulated end region and a second non-insulated end region, the insulated middle region including insulation material exterior to and coupled to the base pipe; and an optical cable positioned within the insulation material tbe optical cable having a first end and a second end both positioned external the insulated middle region.

Example 47 is the tubular of example 46 wherein the optical cable extends through tbe insulated middle region in a path parallel a longitudinal axis of the base pipe.

Example 48 is the tubular of examples 46 or 47 further comprising a second optical cable positioned within the insulation material, the second optical cable having second ends positioned external the insulated middle region.

Example 49 is the tubular of examples 46-48 wherein both of the first end and the second end of the optical cable are non-terminated.

Example 50 is the tubular of examples 46-49 further comprising a component coupled to the optical cable, wherein the component is positioned within the insulation material in the insulated middle region.

Example 51 is the tubular of examples 46-50 further comprising a first cable protector and a second cable protector positioned proximate respective ones of a base pipe first end and a base pipe second end, wherein each of the first cable protector and the second cable protector is shaped to accept and protect respective ones of the first end and the second end of the optical cable.

Example 52 is the tubular of examples 46-51 wherein the optical cable is positioned contacting the base pipe.

Example 53 is an assembly comprising the tubular of examples 46-52; a second tubular having a second base pipe including an additional insulated middle region surrounded by an additional first non-insulated end region and an additional second non-insulated end region, the additional insulated middle region including additional insulation material exterior to and coupled to the second base pipe; and a second optical cable positioned within the additional insulation material, the second optical cable having second ends positioned external the additional insulated middle region, wherein the base pipe is coupled to the second base pipe, and wherein the optical cable is optically coupled to the second optical cable.

Example 54 is an assembly comprising a first base pipe including a first insulated middle region surrounded by first non-insulated end regions, the first insulated middle region including first insulation material exterior to and coupled to the first base pipe; a second base pipe coupled to the first base pipe at a coupling region, the second base pipe including a second insulated middle region surrounded by second non-insulated end regions, the second insulated middle region including second insulation material exterior to and coupled to the second base pipe; a first optical cable positioned within the first insulation material and extending between the first non-insulated end regions and through the first insulated middle region; and a second optical cable optically coupled to the first optical cable, the second optical cable positioned within tire second insulation material and extending between the second non-insulated end regions and through the second insulated middle region.

Example 55 is the assembly of example 54 wherein a first portion of the first optical cable is coupled to a second portion of the second optical cable, and wherein the first portion and the second portion are wrapped around the coupling region.

Example 56 is the assembly of examples 54 or 55 wherein the first optical cable extends through the first insulated middle region in a path parallel a first longitudinal axis of the first base pipe, and wherein the second optical cable extends through the second insulated middle region in a second path parallel a second longitudinal axis of the second base pipe.

Example 57 is the assembly of examples 54-56 further comprising a component optically coupled to both the first optical cable and the second optical cable, wherein the component is positioned within the first insulation material in the first insulated middle region.

Example 58 is the assembly of example 57 wherein the component is an optical amplifier or an optical repeater.

Example 59 is the assembly of examples 54-58 wherein the first optical cable is positioned contacting the first base pipe, and wherein the second optical cable is positioned contacting the second base pipe.

Example 60 is the assembly of examples 54-59 further comprising supplemental insulating material deposited around the coupling region, wherein a first portion of the first optical cable is coupled to a second portion of the second optical cable, and wherein the supplemental insulating material surrounds the first portion and the second portion.

Example 61 is a tubular comprising a base pipe for transporting hydrocarbons; insulation material exterior to and coupled to the base pipe; and a cable positioned within the insulation material the cable extending through an entire length of the insulation material.

Example 62 is the tubular of example 61 wherein the cable extends through the entire length of the insulation material in a path parallel a longitudinal axis of the base pipe.

Example 63 is the tubular of examples 61 or 62 further comprising a second cable positioned within the insulation material and directly adjacent the base pipe, wherein the second cable extends through the entire length of the insulation material.

Example 64 is the tubular of examples 61-63 further comprising a component coupled to the cable, wherein the component is positioned within the insulation material.

Example 65 is the tubular of examples 61-64 wherein the cable has a first cable end and a second cable end, and wherein the first cable end extends beyond a first insulation end and the second cable end extends beyond a second insulation end.

Example 66 is the tubular of examples 61-65 wherein the cable is positioned within a conduit, and wherein the conduit is positioned within the insulation material.

Example 67 is the tubular of examples 61-65 wherein the insulation material includes a channel, wherein the cable is positioned within the channel, and wherein supplemental insulation material is deposited sithin the channel to secure the cable within the channel.

Example 68 is a subsea pipeline comprising a plurality of base pipes coupled together; insulation material exterior to and coupled to the plurality of base pipes; and a cable positioned within the insulation material the cable extending through the insulation material of each of the plurality of base pipes, the cable including a first end and a second end.

Example 69 is the pipeline of example wherein the first end is coupled to a first surface coupling, and wherein the second end is coupled to a second surface coupling.

Example 70 is the pipeline of example 68 wherein the first end is coupled to a surface coupling, and wherein the second end is coupled to a subsea coupling.

Example 71 is the pipeline of example 68 wherein the first end is coupled to a first subsea coupling, and wherein the second end is coupled to a second subsea coupling.

Example 72 is the pipeline of examples 68-71 further comprising a second cable positioned within the insulation material, wherein the second cable extends through the insulation material of each of the plurality of base pipes.

Example 73 is the pipeline of examples 68-72 further comprising a component operatively coupled in-line with the cable, wherein the component is positioned within the insulation material.

Example 74 is the pipeline of example 73 wherein the component is an optical amplifier or an optical repeater, and wherein the cable is an optical cable.

Example 75 is the pipeline of examples 68-74 wherein the cable is positioned within a plurality of conduits, and wherein each of the plurality of conduits is positioned within the insulation material.

Example 76 is the pipeline of examples 68-74 wherein the insulation material includes a plurality of channels, wherein the cable is positioned within the plurality of channels, and wherein the cable is secured within the plurality of channels by supplemental insulation material deposited therein.

Example 77 is a method of manufacturing a tubular comprising providing a base pipe; coupling insulation material to the base pipe; and positioning an optical cable within the insulation material.

Example 78 is the method of example 77 wherein positioning the optical cable within the insulation material includes placing the optical cable directly adjacent the base pipe while the insulation material is being coupled to the base pipe.

Example 79 is the method of example 77 further comprising forming a channel in the insulation material and wherein positioning the optical cable within the insulation material includes placing the optical cable within the channel and depositing supplemental insulation material in the channel.

Example 80 is the method of example 79 wherein forming the channel includes cutting the insulation material.

Example 81 is the method of examples 79 or 80 wherein forming the channel includes placing a channel mold proximate the base pipe while the insulation material is being coupled to the base pipe.

Example 82 is the method of examples 79-81 wherein forming the channel includes applying force to the insulation material through an embossing tool in a shape of the channel.

Example 83 is the method of example 77 wherein the insulation material includes a conduit, and wherein positioning the optical cable within the insulation material includes drawing the optical cable through the conduit.

Example 84 is the method of example 83 wherein positioning the optical cable within the insulation material further includes attaching the optical cable to a draw line.

Example 85 is the method of example 77, 83 or 84 wherein the insulation material includes a conduit, and wherein positioning the optical cable within the insulation material includes pushing the optical cable through the conduit using a pressurized fluid.

Example 86 is a method of installing a tubular comprising providing a first base pipe having a first end and a second end, the first base pipe having insulation material, wherein a cable is positioned within the insulation material of the first base pipe; providing a second base pipe having a first end and a second end, the second base pipe having insulation material; coupling the first end of the first base pipe to the second end of the second base pipe; and positioning the cable in the insulation material of the second base pipe.

Example 87 is the method of example 86 wherein the second base pipe includes a channel, and wherein positioning the cable in the insulation material of the second base pipe includes placing the cable in the channel and depositing supplemental insulation material in the channel.

Example 88 is the method of example 87 further comprising forming the channel in the second base pipe.

Example 89 is the method of example 86 wherein the insulation material of the first base pipe includes a first conduit, wherein the insulation material of the second base pipe includes a second conduit, wherein the cable is positioned within the first conduit, and wherein positioning the cable includes maneuvering the cable through the second conduit.

Example 90 is the method of example 89 further comprising applying a bridge coupler between the first conduit and the second conduit.

Example 91 is the method of example 90 further comprising depositing supplemental insulation material proximate the firs end of the first base pipe and the second end of the second base pipe, wherein depositing the supplemental insulation material includes covering the bridge coupler in the supplemental insulation material.

Example 92 is the method of examples 89-91 wherein maneuvering the cable through the second conduit includes attaching the cable to a draw line and pulling the cable through the second conduit using the draw line.

Example 93 is the method of examples 89-92 wherein maneuvering the cable through the second conduit includes applying pressurized air to the second conduit to force the cable through the second conduit.

Example 94 is the method of examples 86-93 further comprising placing the first base pipe and the second base pipe at opposite ends of a first welding station on a boat.

Example 95 is the method of examples 86-94 further comprising positioning the first base pipe and the second base pipe along a seabed.

Example 96 is the method of examples 86-95 wherein coupling the first end of the first base pipe to the second end of the second base pipe includes welding together the first end of the first base pipe and the second end of the second base pipe.

Example 97 is a method of installing a tubular comprising providing a first base pipe having a first end and a second end, the first base pipe having insulation material, wherein a first cable is positioned within the insulation material of the first base pipe; providing a second base pipe having a first end and a second end, the second base pipe having insulation material wherein a second cable is positioned within the insulation material of the second base pipe; welding together the first end of the first base pipe and the second end of the second base pipe; and coupling the first cable to the second cable.

Example 98 is the method of example 97 wherein fee insulation material of the first base pipe includes a first conduit, wherein the insulation material of the second base pipe includes a second conduit, wherein the first cable is positioned within the first conduit, and wherein the second cable is positioned within the second conduit.

Example 99 the method of examples or further comprising wrapping a first end of the first cable and a second end of the second cable around the first end of the first base pipe and the second end of the second base pipe, wherein coupling the first cable to the second cable includes coupling the first end of the first cable to the second end of the second cable.

Example 100 is the method of examples 97-99 further comprising depositing supplemental insulation material proximate the first end of the first base pipe and the second end of the second base pipe, wherein depositing the supplemental insulation material includes covering the first end of the first cable and the second end of the second cable in the supplemental insulation material.

Example 101 is the method of examples 97-100 wherein the first cable and the second cable are optical cables, and wherein coupling the first cable and the second cable include optically splicing together the first cable and the second cable.

Example 102 is the method of examples 97-100 wherein coupling the first cable to the second cable includes coupling the first cable to a component and coupling the second cable to the component.

Example 103 is the method of examples 97-102 further comprising placing the first base pipe and the second base pipe at opposite ends of a first welding station on a boat.

Example 104 is the method of examples 97-103 wherein the welding and the coupling occur simultaneously.

Example 105 is the method of examples 97-104 further comprising positioning the first base pipe and the second base pipe along a seabed.

Example 106 is a tubular comprising a base pipe for transporting hydrocarbons, insulation material exterior to and coupled to the base pipe, and a waveguide positioned within the insulation material, the waveguide extending through an entire length of the insulation material.

Example 107 is the tubular of example 106 wherein the waveguide extends through the entire length of the insulation material in a path parallel a longitudinal axis of the base pipe.

Example 108 is the tubular of examples 106 or 107 wherein the waveguide is a waveguide pipe made of an electrically conductive material having an inner diameter.

Example 109 is the tubular of example 108 wherein the inner diameter of the waveguide pipe is filled with a transparent dielectric material.

Example 110 is the tubular of examples 108 or 109 further comprising an optical cable positioned within the inner diameter of the waveguide pipe.

Example 111 is the tubular of examples 106-110 wherein the waveguide is structured to operate in the terahertz regime.

Example 112 is the tubular of examples 106-111 wherein the waveguide is positioned within a conduit, and wherein the conduit is positioned within the insulation material.

Example 113 is the tubular of examples 106-111 wherein the insulation material includes a channel, wherein the waveguide is positioned within the channel, and wherein supplemental insulation material is deposited within the channel to secure the waveguide within the channel.

Example 114 is a subsea pipeline comprising a plurality of base pipes coupled together; insulation material exterior to and coupled to the plurality of base pipes; and a waveguide positioned within the insulation material, the waveguide extending through the insulation material of each of the plurality of base pipes, the waveguide including a first end and a second end.

Example 115 is the pipeline of example 114 wherein the first end is coupled to a first surface coupling, and wherein the second end is coupled to a second surface coupling.

Example 116 is the pipeline of example 114 wherein the first end is coupled to a surface coupling, and wherein the second end is coupled to a subsea coupling.

Example 117 is the pipeline of example 114 wherein the first end is coupled to a first subsea coupling, and wherein the second end is coupled to a second subsea coupling.

Example 118 is the pipeline of examples 114-117 wherein the waveguide is a waveguide pipe made of an electrically conductive material having an inner diameter.

Example 119 is the pipeline of example 118 wherein the inner diameter of the waveguide pipe is filled with a transparent dielectric material.

Example 120 is the pipeline of examples 118 or 119 further comprising an optical cable positioned within the inner diameter of the waveguide pipe.

Example 121 is the pipeline of examples 118-120 wherein the waveguide is structured to operate in the terahertz regime.

Example 122 is the pipeline of examples 114-121 wherein the waveguide is positioned within a plurality of conduits, and wherein each of the plurality of conduits is positioned within the insulation material.

Example 123 is the pipeline of examples 114-121 wherein the insulation material includes a plurality of channels, wherein the waveguide is positioned within the plurality of channels, and wherein the waveguide is secured within the plurality of channels by supplemental insulation material deposited therein.

What is claimed is:

1. A pipeline segment, comprising:
   a base pipe for transporting hydrocarbons, the base pipe having a first base pipe end and a second base pipe end;
   insulation material exterior to and coupled to the base pipe;
   an optical component integrated into the insulation material between the first base pipe end and the second base pipe end, wherein the insulation material contacts the optical component and isolates the optical component from the base pipe;
   an optical cable coupled to the optical component, the optical cable integrated into the insulation material, the optical cable extending through the insulation material from the first base pipe end and from the second base pipe end to the optical component to communicatively couple the optical component to other pipeline segments; and
   a first removable cable protector and a second removable cable protector proximate to respective ones of the first base pipe end and the second base pipe end, wherein each of the first removable cable protector and the second removable cable protector is larger in diameter than the base pipe and includes tactile elements configured to aid in aligning the pipeline segment with other pipeline segments, wherein the first removable cable protector and the second removable cable protector accept and contain respective ones of a first cable end and a second cable end of the optical cable for transit and storage of the pipeline segment.

2. The pipeline segment of claim 1, wherein the optical cable extends through the entire length of the insulation material in a path parallel to a longitudinal axis of the base pipe.

3. The pipeline segment of claim 1, further comprising:
   a second cable positioned within the insulation material and directly adjacent the base pipe, wherein the second cable extends through the entire length of the insulation material.

4. The pipeline segment of claim 1, wherein the first cable end extends beyond a first insulation end and the second cable end extends beyond a second insulation end.

5. The pipeline segment of claim 1, wherein the insulation material includes a channel, wherein the optical cable is positioned within the channel, and wherein supplemental insulation material is deposited within the channel to secure the cable within the channel.

6. A subsea pipeline, comprising:
   a plurality of pipeline segments, each pipeline segment comprising a base pipe of a plurality of base pipes coupled together, at least one of the plurality of base pipes having a base pipe end;
   insulation material exterior to and coupled to the plurality of base pipes;
   supplemental insulation material coupled to a welding region between at least two of the plurality of base pipes;
   an amplifier or repeater positioned within the insulation material, wherein the insulation material contacts the amplifier or repeater;
   a cable coupled to the amplifier or repeater, the cable integrated into the insulation material to communicatively couple the amplifier or repeater to the plurality of pipeline segments; and
   a cable protector positioned proximate to the base pipe end, the cable protector being larger in diameter than the plurality of base pipes and including tactile elements, configured to aid in aligning the pipeline segments, wherein the cable protector accepts and contains an end of the cable to protect the end of the cable.

7. The subsea pipeline of claim 6, wherein the amplifier or repeater is coupled to a first surface coupling or to a second surface coupling.

8. The subsea pipeline of claim 6, wherein the amplifier or repeater is coupled to a first surface coupling or to a subsea coupling.

9. The subsea pipeline of claim 6, wherein the amplifier or repeater is coupled to a first subsea coupling or to a second subsea coupling.

10. The subsea pipeline of claim 6, further comprising:
    a second cable positioned within the insulation material, wherein the second cable extends through the insulation material of each of the plurality of base pipes.

11. The subsea pipeline of claim 6, where the amplifier or repeater is operatively coupled in-line with the cable.

12. The subsea pipeline of claim 11, wherein the amplifier or repeater is an optical amplifier or an optical repeater, and wherein the cable is an optical cable.

13. The subsea pipeline of claim 6, wherein the insulation material includes a plurality of channels, wherein the cable is positioned within the plurality of channels, and wherein the cable is secured within the plurality of channels.

* * * * *